United States Patent
Manabe et al.

(10) Patent No.: US 9,818,496 B2
(45) Date of Patent: Nov. 14, 2017

(54) METHOD FOR TREATING TRITIUM-WATER-CONTAINING RAW WATER

(71) Applicant: DE NORA PERMELEC LTD, Fujisawa-shi, Kanagawa (JP)

(72) Inventors: Akiyoshi Manabe, Fujisawa (JP); Masahiro Ohara, Fujisawa (JP); Yoshinori Nishiki, Fujisawa (JP); Akira Kunimatsu, Fujisawa (JP)

(73) Assignee: DE NORA PERMELEC LTD, Fujisawa-Shi, Kanagawa (JP)

( * ) Notice: Subject to any disclaimer, the term of this patent is extended or adjusted under 35 U.S.C. 154(b) by 0 days.

(21) Appl. No.: 15/326,689

(22) PCT Filed: Jan. 28, 2015

(86) PCT No.: PCT/JP2015/052345
§ 371 (c)(1),
(2) Date: Jan. 17, 2017

(87) PCT Pub. No.: WO2016/027479
PCT Pub. Date: Feb. 25, 2016

(65) Prior Publication Data
US 2017/0206991 A1    Jul. 20, 2017

(30) Foreign Application Priority Data

Aug. 18, 2014 (JP) ................. 2014-166113

(51) Int. Cl.
*G21F 9/06* (2006.01)
*G21F 9/08* (2006.01)
*G21F 9/02* (2006.01)

(52) U.S. Cl.
CPC .......... *G21F 9/06* (2013.01); *G21F 9/02* (2013.01); *G21F 9/08* (2013.01)

(58) Field of Classification Search
CPC .............. G21F 9/06; G21F 9/02; G21F 9/08
USPC ........................................................ 588/20
See application file for complete search history.

(56) References Cited

FOREIGN PATENT DOCUMENTS

| | | |
|---|---|---|
| JP | 5433997 | 3/1979 |
| JP | 08-026703 | 1/1996 |
| JP | 08-323154 | 12/1996 |
| JP | 3406390 | 5/2003 |
| JP | 3977446 | 9/2007 |
| JP | 2015029921 | 2/2015 |

OTHER PUBLICATIONS

International Search Report, issued in the corresponding International PCT application No. PCT/JP2015/052345, dated Mar. 3, 2015, 4 pages.
Saito et al., "Tritium Enrichment by Electrolysis Using Solid Polymer Electrolyte", RadioIsotopes, vol. 45, No. 5, pp. 285-292, 1996 (English abstract provided).
"Options for handling tritium", Ministry of Economy, Trade and Industry—Tritium Water Task Force Secretariat, Feb. 27, 2014, (English abstract provided); can be found at http://www.meti.go.jp/earthquakenuclear/20140227_01.html.
"Proposal No. 252 Contaminated water treatment by alkali water electrolysis method (Tritium Treatment)", Agency for Natural Resources and Energy, Nov. 8, 2013, (English abstract provided).

*Primary Examiner* — Edward Johnson
(74) *Attorney, Agent, or Firm* — Hamre, Schumann, Mueller & Larson, P.C.

(57) ABSTRACT

The present invention relates to a method for treating tritium water-containing raw water, the method including supplying a part of raw water containing tritium water and alkali water to a circulation tank, mixing the raw water with alkali water in the circulation tank to obtain an electrolyte adjusted so as to have a desired alkali concentration, and continuously electrolyzing the electrolyte while circulating the electrolyte, thereby subjecting the raw water stored in the storage tank to alkali water electrolysis and thus gasifying the raw water.

According to the invention, by gasifying tritium water-containing raw water by alkali water electrolysis, the tritium concentration in a tritium-containing hydrogen gas is diluted to 1/1,244 and the tritium water-containing raw water can be reduced in volume.

11 Claims, 5 Drawing Sheets

[FIG. 1]
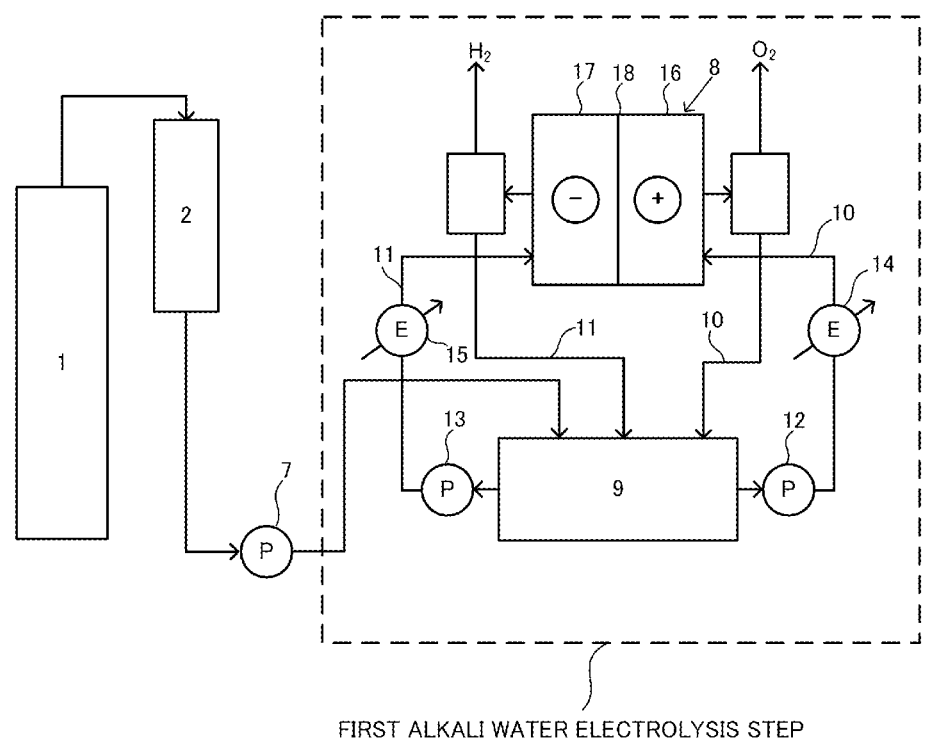
ALKALI WATER ELECTROLYSIS SYSTEM (I)
FIRST ALKALI WATER ELECTROLYSIS STEP

[FIG. 2]
ALKALI WATER ELECTROLYSIS SYSTEM (II)
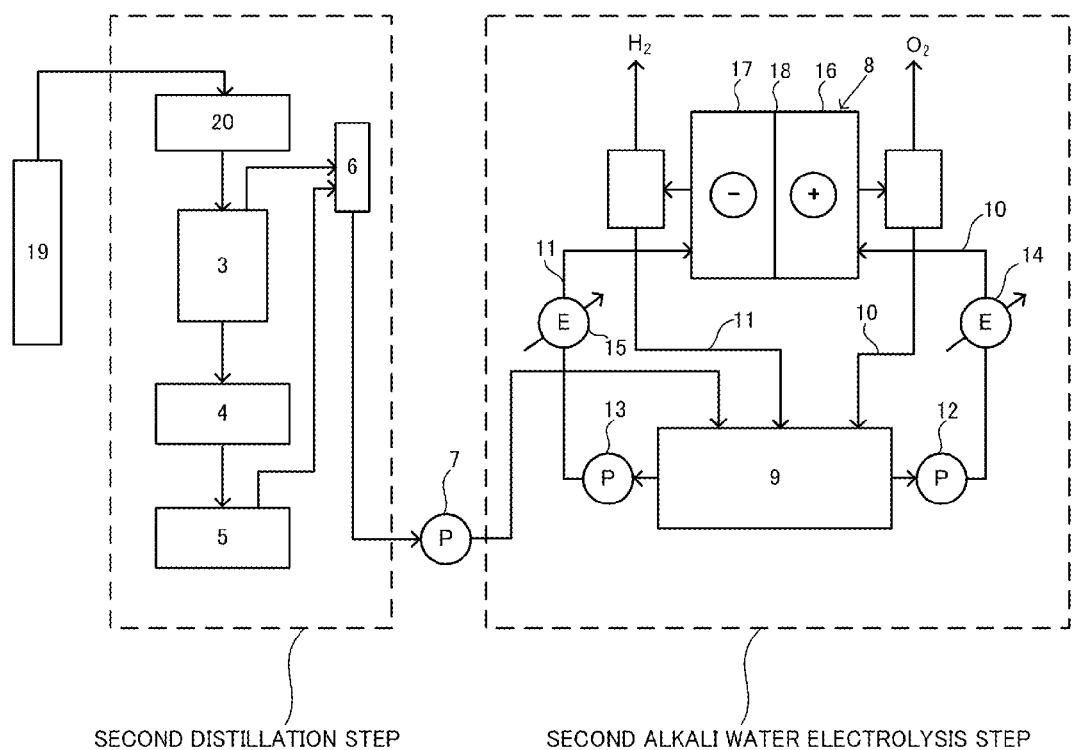
SECOND DISTILLATION STEP    SECOND ALKALI WATER ELECTROLYSIS STEP

[FIG. 3]
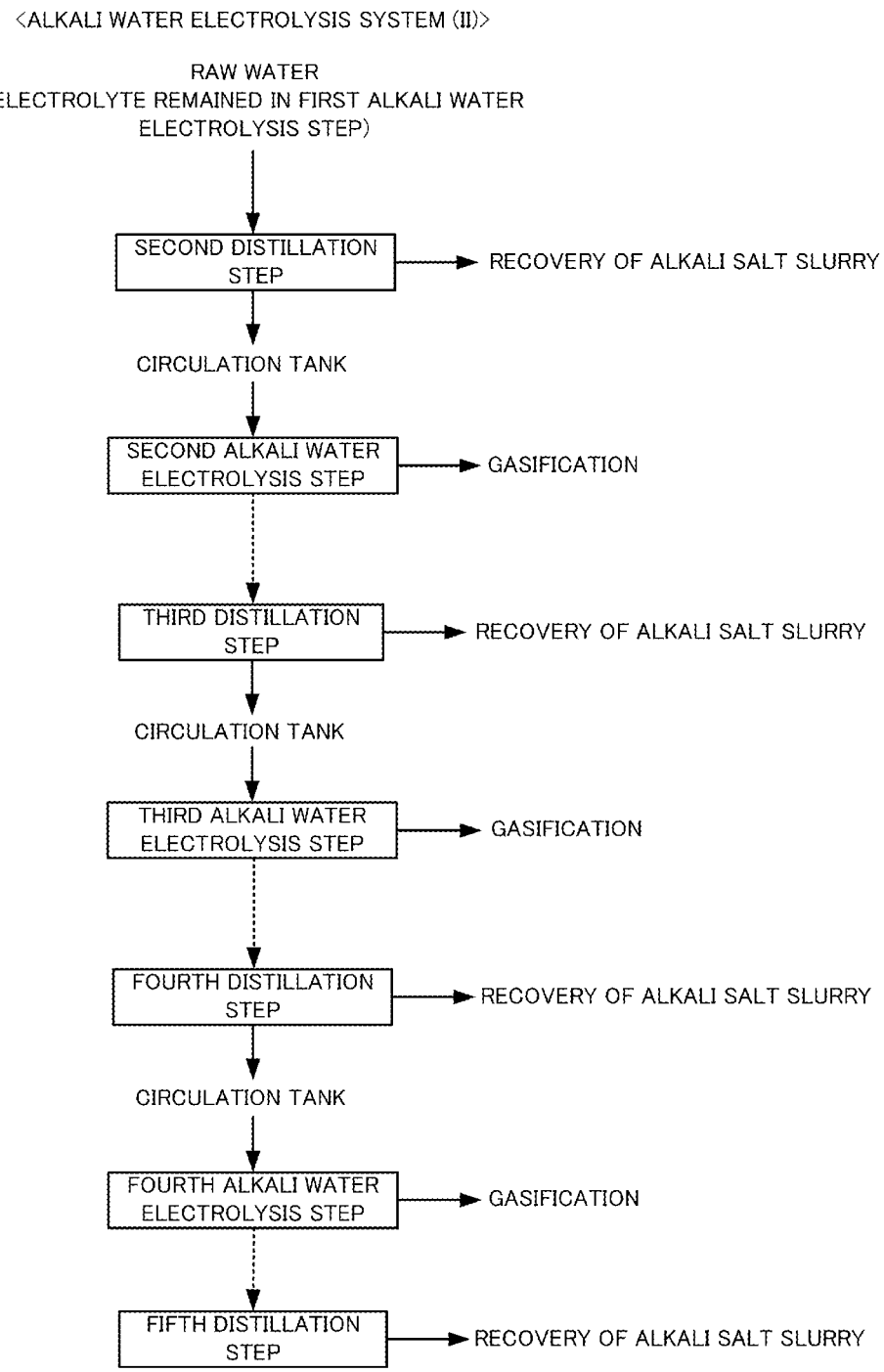

[FIG. 4]
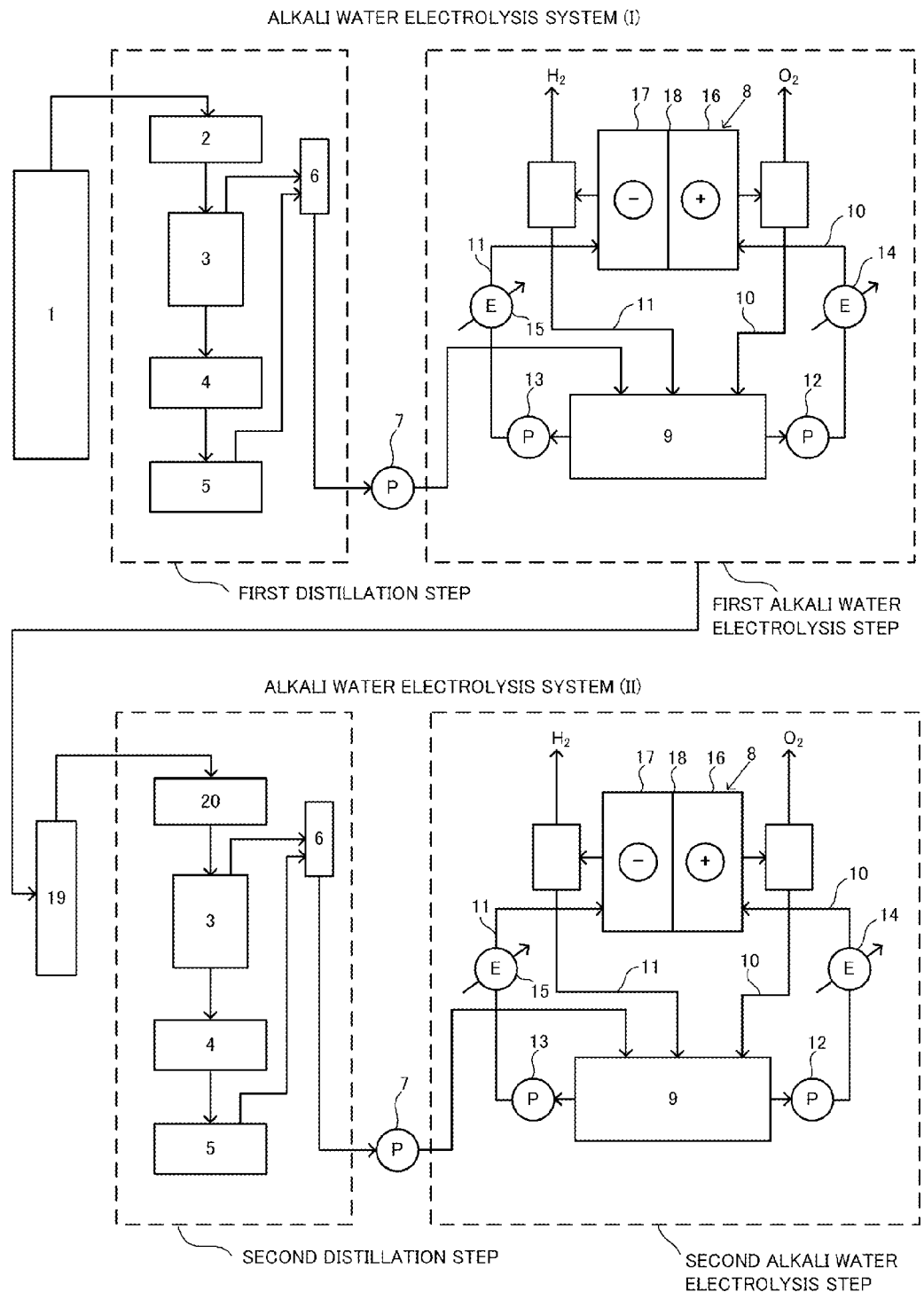

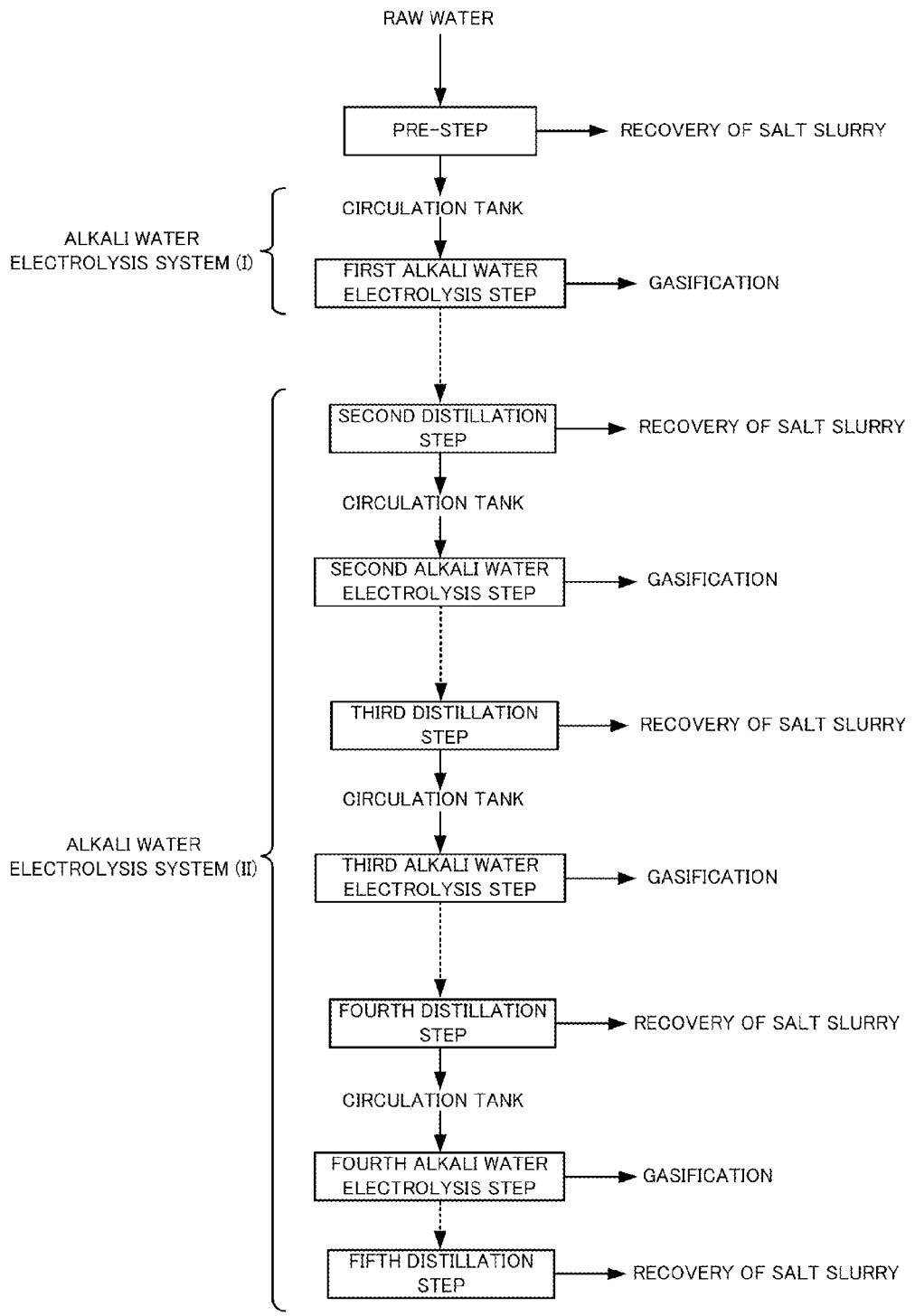
[FIG. 5]

METHOD FOR TREATING TRITIUM-WATER-CONTAINING RAW WATER

TECHNICAL FIELD

The present invention relates to a method for treating tritium water-containing raw water in which, by gasifying tritium water-containing raw water through alkali water electrolysis, tritium concentration is diluted to 1/1,244 relative to the tritium concentration in the raw water, and simultaneously, volume of the tritium water-containing raw water is reduced.

The present invention also relates to a method of taking out tritium in an amount of 1/20 of the permissible discharge standard to open air and leading it to high altitudes separated from any living organisms.

The present invention also relates to a method for recovering tritium as concentrated tritium water-containing water by reacting tritium-containing hydrogen gas with water vapor.

The present invention also relates to a method for treating tritium water-containing raw water in which raw water hardly containing impurities like chloride ions is used as the tritium water-containing raw water, and by gasifying the raw water through continuous electrolysis, and thereby tritium concentration is diluted, and simultaneously the volume of the tritium water-containing raw water is reduced. The present invention also relates to a method for treating tritium water-containing raw water in which, after performing the continuous electrolysis, alkali water electrolysis is further performed for the separated tritium water-containing water while recovering an alkali component used for the electrolysis.

The present invention also relates to a method for treating tritium water-containing raw water in which raw water containing a large amount of impurities like chloride ions is used as the tritium water-containing raw water, continuous electrolysis is performed after removing the impurities and tritium concentration is diluted, and simultaneously the volume of the tritium water-containing raw water is reduced. The present invention also relates to a method for treating tritium water-containing raw water in which, after performing the continuous electrolysis, the electrolysis is further performed while recovering an alkali component used for the electrolysis and volume of the tritium water-containing water is further reduced.

BACKGROUND ART

Most of the tritium on earth is present as an oxide like tritiated water, i.e., tritium water. Concentration of tritium water which circulates in air is believed to have almost a constant value in animals and plants of all ages in any area. From the reduced amount of concentration in water, a period separated from the air circulation can be determined, and dating of underground water can be also made. Concentration of tritium water is also used for actual investigation of a flow of underground water in the field of civil engineering and agriculture. Tritium is mixedly present in water as tritium water including oxygen, and it is widely present in water resources including water vapor, rainfall, underground water, stream water, lake water, sea water, drinking water, and a living organism as a gas phase, a liquid phase, or a solid phase.

Natural tritium is produced by a reaction between cosmic ray and air. However, due to low production probability, its amount is extremely small. Meanwhile, the tritium produced by the nuclear test in 1950s, a nuclear reactor and the reprocessing of nuclear fuel has been discharged and present in large amount in an environment (fallout tritium). Furthermore, compared to an external system, tritium produced during operation or maintenance of the reactor or reprocessing of nuclear fuel is accumulated and localized at higher level in facilities related to a nuclear reactor. However, due to the reason that the chemical property is almost not different from that of hydrogen, it is discharged under management to atmosphere or sea.

The highest value measured in Japan is 1,100 Bq/L which has been measured on Jun. 21, 2013 at the port of the first nuclear power plant of Fukushima where the nuclear disaster had happened. Since it is difficult for tritium to be separated chemically from hydrogen, a method for physical separation has been tried. However, it is still at a test level and practical success is yet to be made. Thus, radioactivity of the tritium discharged into the environment due to nuclear power plant disaster or the like cannot be removed with a current technology. The contaminated water containing tritium produced from the first nuclear power plant of Fukushima may reach 800,000 $m^3$ or so in the future, and it is desired to have a method for effective treatment therefor as soon as possible.

Meanwhile, as the tritium concentration is at extremely low level, it is general to have electrolysis concentration for improving the measurement precision at the time of measuring the concentration. Herein, a method of preparing a sample solution containing dissolved electrolyte and performing electrolysis across a plate-like panel is known as the electrolysis concentration of heavy water of a related art. There is HDO or HTO as water included in an electrolyte solution in addition to $H_2O$. They are decomposed into hydrogen and oxygen according to water electrolysis in general. However, due to the isotope effect, decomposition of $H_2O$ occurs prior to decomposition of HDO or HTO, and therefore as the concentration of deuterium or tritium increases in the electrolyte solution, concentration occurs. Nickel is used as an anode used for the electrolysis concentration. Steel, iron, nickel and the like are used as a cathode. Those electrodes are cleaned and sample water which is prepared by adding dilute sodium hydroxide as a support salt to water solution containing heavy water is added to a glass container. Then electrolysis is performed by applying electric current. At that time, while the current density is set at 1 to 10 $A/dm^2$ or so and the solution temperature is kept at 5° C. or lower to prevent evaporation of water caused by heating, the electrolysis is generally continued until the liquid amount is reduced to 1/10 or so to have the concentration of deuterium.

Namely, the electrolysis concentration of tritium is based on the property that, like the case of deuterium, electrolysis of tritium water is more difficult than water with light hydrogen. Regarding the electrolysis method including insertion of a metal electrode into an aqueous alkali solution, various studies have been already made so that a standard method is present as an official manual. According to this method, tritium concentration is concentrated with 1 stage. However, in terms of an actual case, there are several problems in the electrolysis concentration of a related art, i.e., the operational works are complicated, tritium concentration rate is limited by the upper limit of electrolyte concentration, mixture gas of hydrogen and oxygen is produced to yield a risk of explosion, it takes long time for the electrolysis, and the method is not suitable for a large-scale treatment.

As the technology is determined from the viewpoint of separating and capturing a barely-contained material with 1 stage, the above problems are mainly caused by using an aqueous alkali solution electrolysis of a related art in which handling an alkali water electrolytic water solution is difficult, separating the gas generated from an anode is difficult, increasing electrolytic current is difficult due to forming of air bubbles on a metal surface, or the like.

In this regard, as an electrolysis method for water which receives attention in recent years, a water electrolysis using a solid polymer electrolyte (hereinbelow, referred to as "SPE") can be mentioned (hereinbelow, referred to as "SPE water electrolysis"). The first SPE water electrolysis is made by General Electric Company of USA, by applying the technology of fuel cell in early 1970s. With regard to the structure of electrolysis part, both surfaces of a SPE membrane are sandwiched between porous metal electrodes, and by immersing them in pure water and just applying electric current, electrolysis is caused to release decomposed gas from the porous electrodes. SPE is a kind of a cation exchange resin, and it has a structure in which a sulfonic acid group or the like for having ion transport is chemically bound to a polymer chain. When electric current is applied between two electrodes, water is decomposed and oxygen gas is produced at the anode and hydrogen ions are produced. Those hydrogen ions are transported to the cathode after moving through the sulfonic acid groups of SPE, and after taking electrons, hydrogen gas is generated. Apparently, SPE itself does not undergo any change and is maintained in a solid phase.

In a case of using the SPE for electrolysis concentration of tritium, it is expected to have the following advantages compared to a method of a related art.

1) Distilled water can be directly decomposed. Namely, dissolution and neutralization of an electrolyte and removal of an electrolyte, which are essential in aqueous alkali solution electrolysis, are not necessary and the rate of volume decrease of sample water is limitless, in principle.

2) As the electrode surface is not covered by air bubbles, electrolysis can be carried out with high electric current and thus the time for electrolysis can be shortened.

3) As the hydrogen gas and oxygen gas are separately produced at different sides of a SPE membrane, gas treatment is easy, and it is much safer than a method of a related art in which explosive mixture gas is handled.

Furthermore, regarding the electrolysis concentration method of heavy water based on SPE water electrolysis, there are Patent Literatures 1 and 2 suggested by the applicant company and Non Patent Literature 1.

However, in a case of using Patent Literatures 1 and 2 and Non Patent Literature 1, an application can be made for a device for analysis or concentration of small scale, but they are not suitable for a treatment of large scale based on the following reasons. Since an electrolyte solution to be used is pure water, to have no flow of electric current in the electrolyte solution, the solid polymer membrane as a constitutional element needs to be strongly clamped at an anode and a cathode with surface pressure of 20-30 Kg/cm$^2$ or so. As such, it is required for each member of an electrolysis bath to have high strength. However, having a large reaction area like 1 m$^2$ or more is not practical when economic efficiency or operational property is considered. Also, they are not suitable for electrolysis concentration or fractionation of raw water containing large volume of heavy water due to high cost involved with facilities or the like.

CITATION LIST

Patent Literature

Patent Literature 1: JP 8-26703 A (U.S. Pat. No. 3,406,390)
Patent Literature 2: JP 8-323154 A (U.S. Pat. No. 3,977,446)

Non Patent Literature

Non Patent Literature 1: Tritium Electrolytic Enrichment using Solid Polymer Electrolyte (RADIOISOTOPES, Vol. 45, No. 5 May 1996 (published by Japan Radioisotope Association))

SUMMARY OF INVENTION

Technical Problem

An object of the present invention is to solve the problems of a prior art and to provide a method for treating tritium water-containing raw water which is suitable for large-scale treatment using electrolysis. More specifically, an object of the present invention is to provide a method for diluting tritium at the concentration of 1/1,244 by gasifying tritium water-containing raw water through continuous alkali water electrolysis under continuous supply of raw water for conversion into tritium-containing hydrogen gas and oxygen gas to lower the influence of tritium on a living organism. An object of the present invention is to provide a method of taking out tritium in an amount of 1/20 or less of the permissible discharge standard to open air and leading it to high altitudes separated from any living organisms. An object of the present invention is to provide a method for recovering tritium as concentrated tritium water-containing water by reacting the gasified tritium-containing hydrogen gas with water vapor. An object of the present invention is also to provide a method for allowing continuous electrolysis in the case where raw water hardly containing impurities like chloride ions is used as the raw water containing the tritium water, and thereby diluting tritium concentration and reducing volume of tritium water-containing raw water. An object of the present invention is also to provide a method for, after performing the continuous electrolysis of tritium water-containing raw water, treating tritium water-containing raw water in which alkali water electrolysis is further performed with batch supply while recovering the alkali component used for the electrolysis and thereby diluting tritium concentration and reducing the volume of tritium water-containing water. An object of the present invention is also to provide a method of performing the above-mentioned continuous electrolysis after removing the impurities in a pre-step in the case where raw water containing impurities like a large amount of chloride ions is used as the tritium water-containing raw water, and thereby diluting tritium concentration and reducing volume of tritium water-containing raw water. An object of the present invention is also to provide a method for, with regard to those methods, after performing the continuous electrolysis of tritium water-containing raw water, treating tritium water-containing raw water in which alkali water electrolysis is further performed with batch supply while recovering the alkali component used for the electrolysis and thereby diluting tritium concentration and reducing the volume of tritium water-containing water.

Solution to Problem

To achieve the object described above, the first solving means of the present invention is to provide a method for treating tritium water-containing raw water by which tritium water-containing raw water is treated by a first alkali water electrolysis step including steps of:

(1) supplying a part of raw water containing tritium water and alkali water to a circulation tank;

(2) mixing the raw water with the alkali water in the circulation tank to obtain an electrolyte adjusted so as to have a desired alkali concentration, supplying the electrolyte to an alkali water electrolysis device, and performing electrolysis treatment;

(3) supplying the raw water continuously to the circulation tank in an amount which corresponds to raw water lost by the above electrolysis treatment to maintain alkali concentration at an adjusted initial concentration, and continuing the electrolysis treatment while circulating the electrolyte in order to continuously perform the alkali water electrolysis treatment;

(4) gasifying the raw water to tritium-containing hydrogen gas and oxygen gas so that tritium concentration is diluted to 1/1,244 relative to tritium concentration in the raw water; and (5) reducing the volume of the raw water.

To achieve the object described above, the second solving means of the present invention is to provide a method for treating tritium water-containing raw water in which the tritium-containing hydrogen gas generated by the first alkali water electrolysis step is taken out to open air.

To achieve the object described above, the third solving means of the present invention is to provide a method for treating tritium water-containing raw water in which the tritium-containing hydrogen gas generated by the first alkali water electrolysis step is sent to a catalyst tower, the tritium-containing hydrogen gas is reacted with water vapor on a catalyst filled in the catalyst tower, and the tritium is recovered as concentrated tritium water-containing water.

To achieve the object described above, the fourth solving means of the present invention is to provide a method for treating tritium water-containing raw water in which the method includes:

the first alkali water electrolysis step for performing continuously the alkali water electrolysis treatment;

a second distillation step in which, after completion of the first alkali water electrolysis step, the entire amount of the electrolyte remained in the first alkali water electrolysis step is supplied to an evaporator, an alkali component in the electrolyte is recovered as alkali salt slurry, and simultaneously, tritium water-containing water distilled by the evaporator is taken out; and a second alkali water electrolysis step in which the tritium water-containing water taken out by the second distillation step and new alkali water are supplied to a circulation tank, the tritium water-containing water is mixed with the new alkali water in the circulation tank so as to have an electrolyte solution with a desired alkali concentration, electrolysis capacity of an alkali water electrolysis device is adjusted to the capacity suitable for a treatment amount of the electrolyte, an alkali water electrolysis treatment is performed followed by batch treatment, the tritium water-containing water is gasified and converted to tritium-containing hydrogen gas and oxygen gas so that tritium concentration is diluted to 1/1,244 relative to tritium concentration in the tritium water-containing water, and the volume of the raw water is reduced, if necessary, further comprising a step of repeating several times the second distillation step and the second alkali water electrolysis step until the completion of the batch treatment in which, at the time of repeating several times, the capacity of the alkali water electrolysis device used for the second alkali water electrolysis step is gradually reduced and the treatment is repeated.

To achieve the object described above, the fifth solving means of the present invention is to provide, regarding the above first solving means, a method for treating tritium water-containing raw water in which, when raw water which contains impurities including a large amount of chloride ions is used as the tritium water-containing raw water, a first distillation step for removing the impurities is further provided as a pre-step of the first alkali water electrolysis step, and in the first distillation step, the raw water which contains impurities including the chloride ions is supplied to the evaporator and the impurities are removed as salt slurry, and simultaneously, the tritium water-containing raw water after removing the impurities is taken out and then continuously supplied to be treated by the first alkali water electrolysis step.

To achieve the object described above, the sixth solving means of the present invention is to provide, regarding the above fourth solving means, a method for treating tritium water-containing raw water in which, when raw water which contains impurities including a large amount of chloride ions is used as the tritium water-containing raw water, a first distillation step for removing the impurities is provided as a pre-step of the first alkali water electrolysis step, and in the first distillation step, the raw water which contains impurities including the chloride ions is supplied to the evaporator and the impurities are removed as salt slurry, and simultaneously, the tritium water-containing raw water after removing the impurities is taken out and then continuously supplied to be treated by the first alkali water electrolysis step.

To achieve the object described above, the seventh solving means of the present invention is to provide, regarding the above fifth or sixth solving means, a method for treating tritium water-containing raw water in which, in the first distillation step, the salt slurry is concentrated and then separated and recovered as a solid matter.

To achieve the object described above, the eighth solving means of the present invention is to provide, regarding the above fourth solving means, a method for treating tritium water-containing raw water in which, in the second distillation step, the alkali salt slurry is concentrated and then separated and recovered as a solid matter.

To achieve the object described above, the ninth solving means of the present invention is to provide, regarding the above fourth solving means, a method for treating tritium water-containing raw water in which, in the first alkali water electrolysis step, alkali water with relatively high concentration is used as the alkali water, the electrolysis treatment is performed at relatively high current density, and in the second alkali water electrolysis step, alkali water with relatively low concentration is used as the alkali water, the electrolysis treatment is performed at relatively low current density.

To achieve the object described above, the tenth solving means of the present invention is to provide, regarding the above first solving means, a method for treating tritium water-containing raw water in which, in the first alkali water electrolysis step, 15% by mass or more of alkali water is used as the alkali water, and the electrolysis treatment is performed at current density of 15 $A/dm^2$ or higher.

To achieve the object described above, the eleventh solving means of the present invention is to provide, regarding the above fourth solving means, a method for treating tritium water-containing raw water in which, in the second alkali water electrolysis step, 2 to 10% by mass of alkali water is used as the alkali water, and the electrolysis treatment is performed at current density of 5 to 20 A/dm².

Advantageous Effects of Invention (1) According to the present invention, by gasifying tritium water-containing raw water and converting it to tritium-containing hydrogen gas and oxygen gas, the tritium concentration can be diluted to 1/1,244, and the influence of tritium on living organism can be reduced.

Furthermore, although it is preferable that the whole amount of tritium water-containing raw water is treated by alkali water electrolysis. If the volume of the tritium water is large or there is any other reason related to economic efficiency or the like, the alkali water electrolysis can be carried out in several divided times.

(2) According to the present invention, by gasifying tritium water-containing raw water, the tritium concentration can be diluted to 1/1,244, and thus the tritium can be taken out in an amount of 1/20 or less of the permissible discharge standard to open air and can be led to high altitudes separated from any living organisms.

(3) According to the present invention, in the method for performing continuous alkali water electrolysis treatment of tritium water-containing raw water by the first alkali water electrolysis step, as the gasified tritium gas containing hydrogen gas is reacted with water vapor, the treated product can be recovered as concentrated tritium water-containing water.

(4) According to the present invention, also for tritium water-containing raw water containing impurities like a large amount of chloride ions, the first distillation step for continuous supply to a distillator is provided as a pre-step to remove the impurities as salt slurry, and thus the effect described above can be obtained. Hereinbelow, a treatment by the first alkali water electrolysis step and a treatment consisting of the first distillation step as a pre-step and the first alkali water electrolysis step are referred to as the "alkali water electrolysis system (I)".

(5) According to the fourth solving means of the present invention, after completion of the continuous electrolysis of the first alkali water electrolysis step in the alkali water electrolysis system (I), the electrolyte solution (alkali water) remained in the first alkali water electrolysis step is treated in batch mode consisting of the second distillation step and the second alkali water electrolysis step provided after the completion of the second distillation step, and thus the alkali component can be recovered as alkali salt slurry by the second distillation step and the distilled tritium water-containing water can be simultaneously taken out.

(6) According to the fourth solving means of the present invention, after completion of the continuous electrolysis of the first alkali water electrolysis step in the alkali water electrolysis system (I), the electrolyte solution (alkali water) remained in the first alkali water electrolysis step is subjected to an electrolysis treatment by having the tritium water-containing water which has been taken out after completion of the second distillation step as an electrolyte solution and supplying the electrolyte solution to the alkali water electrolysis device while the electrolysis capacity of an alkali water electrolysis device is adjusted to capacity corresponding to treatment amount of the electrolyte solution during the second alkali water electrolysis step of batch mode. Thereby the tritium water-containing water remained after the treatment by the alkali water electrolysis system (I) is diluted to a permissible discharge standard of tritium or lower and then removed, and the volume of the tritium water-containing raw water can be further reduced.

(7) According to the fourth solving means of the present invention, in order to perform a sufficient batch treatment, the volume can be reduced until the tritium water-containing water is almost zero while the volume of the alkali water electrolysis device is gradually decreased (i.e., reducing the facilities) by performing a step for repeating the second distillation step and the second alkali water electrolysis step as the third, the fourth, . . . step. Hereinbelow, the treatment consisting of the second distillation step (used for the third distillation step and the following distillation step) and the second alkali water electrolysis step (used for the third alkali water electrolysis step and the following alkali water electrolysis step) is referred to as the "alkali water electrolysis system (II)".

(8) According to the fifth or the sixth solving means of the present invention, in the case where raw water containing impurities like a large amount of chloride ions is used as the raw water containing tritium water, the impurities are removed as salt slurry by performing the first distillation step as a pre-step of the first alkali water electrolysis step for carrying out the alkali water electrolysis system (I). As such, according to the first alkali water electrolysis step, no impurities are accumulated in the electrolyte solution and the continuous alkali water electrolysis can be carried out smoothly in a stable state for a long period of time.

(9) According to the present invention, in the case where the electrolyte remained after completion of the first alkali water electrolysis step for carrying out the alkali water electrolysis system (I) is treated by the alkali water electrolysis system (II), if necessary, the remaining alkali needs to be recovered as an alkali salt every time during the third, the fourth . . . distillation step like the second distillation step when the second alkali water electrolysis step and the following alkali water electrolysis step are repeated several times. As for the facilities for the distillation steps of the second, the third, and the following steps, the facilities of the first distillation step as a pre-step for removing impurities like a large amount of chloride ions in the tritium water-containing raw water can be also used, and thus significant cost saving can be achieved.

BRIEF DESCRIPTION OF DRAWINGS

FIG. 1 is a flow chart illustrating a first embodiment (corresponding to the above first solving means) of the alkali water electrolysis system (I) according to the present invention, which is, regarding treating of tritium water-containing raw water, performed for treating raw water containing only a small amount of impurities like chloride ions and used for the first alkali water electrolysis step to have continuous alkali water electrolysis while the electrolyte is circulated with the alkali concentration maintained at constant level.

FIG. 2 is a flow chart illustrating a fourth embodiment (corresponding to the above fourth solving means) of the alkali water electrolysis system according to the present invention, which is used for the alkali water electrolysis system (II) consisting of the second distillation step to take out, recover, and treat in batch mode the alkali component of the electrolyte remained in the first alkali water electrolysis step and the second alkali water electrolysis step to have an electrolysis treatment while adjusting the electrolysis capacity of an alkali water electrolysis device to the capacity corresponding to the treatment amount of the electrolyte solution remained in the first alkali water electrolysis step.

FIG. 3 is a flow chart illustrating the fourth embodiment of a constitution in which, regarding the method for treating tritium water-containing raw water by using the alkali water electrolysis system (II) shown in FIG. 2, remaining electrolyte is further treated by the second distillation step, the alkali component is recovered as alkali salt slurry from the distillator, and also the tritium water-containing water obtained by distillation is supplied to a circulation tank and subjected to the second alkali water electrolysis step, and after that, the above recovery and electrolysis are repeated till to have sufficient batch treatment, in which the method is performed during a treatment of the electrolyte solution remaining in the first alkali water electrolysis step of the alkali water electrolysis system (I).

FIG. 4 is a flow chart illustrating a sixth embodiment (corresponding to the above fifth and the sixth solving means) of the alkali water electrolysis system according to the present invention with the alkali water electrolysis system (II) that is performed in the case where, as tritium water-containing raw water, raw water containing a large amount of impurities like chloride ions is used for the treatment, in which the alkali water electrolysis system (II) consists of the first distillation step as a pre-step for removing the impurities as salt slurry, the first alkali water electrolysis step to have continuous alkali water electrolysis while the electrolyte of the alkali water electrolysis system (I) is circulated while being maintained to have constant alkali concentration, the second distillation step for recovering the alkali component of the electrolyte solution remained in the first alkali water electrolysis step as alkali salt slurry, and the second alkali water electrolysis step to have an electrolysis treatment while adjusting the electrolysis capacity of the alkali water electrolysis device to the capacity corresponding to the treatment amount of the electrolyte solution remained in the first alkali water electrolysis step.

FIG. 5 is a flow chart illustrating the sixth embodiment of the treatment method in which the alkali water electrolysis system shown in FIG. 4 is used and raw water containing a large amount of impurities like chloride ions is treated as tritium water-containing raw water.

DESCRIPTION OF EMBODIMENTS

The amount of the contaminated water containing tritium released from the first nuclear power plant of Fukushima is large, and the storage amount of the contaminated water may be as large as 800,000 m³ in future. The present invention is devised under the object of determining a technology by which the stored tritium-contaminated water in the amount of 800,000 m³ is subjected to a tritium separation treatment with treatment capacity of 400 m³/day and the volume of the tritium-contaminated water is reduced to 1 m³ or less, and eventually to 0, and also realizing the technology in consideration of an area of a plant and cost involved with construction and running the plant. One embodiment of the technology is to convert tritium water in tritium-containing water to tritium gas by continuous electrolysis, and after detoxification and taking out to open air, it is led to high altitudes separated from any living organisms.

As described below, according to the present invention, tritium water (HTO) is gasified for conversion into tritium gas (HT) so as to ensure low concentration like 1/20 or less of the permissible discharge standard and the set value of 1 mSv or less per year. The separation coefficient of 1,244 is achieved according to the following calculation formula.

The electrolysis reaction is as described below.

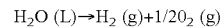

Namely, because the volume of 1 mole of molecular gas is 22.4 L in the standard state, when raw water of 1 L (about 1,000 g) is decomposed and gasified by electrolysis, content of tritium in 1 L of the raw water is diluted by (1000/18)× 22.4=1,244 after the gasification.

This value of separation coefficient is a numerical value that is within the range of tritium water form. Dose coefficient according to chemical type of tritium and age is shown in Table 1. Based on Table 1, it is found that, in terms of the effective dose coefficient showing directly the influence on a human body and an environment, tritium gas (HT) has influence degree of 1/10,000 compared to tritium water (HTO).

TABLE 1

Dose coefficients according to chemical forms of tritium and ages

Dose coefficient (Sv/Bq) (effective dose per unit intake radioactivity)

| | Oral intake | | inhalation intake (soluble tritium or gaseous tritium) *1 | | | |
|---|---|---|---|---|---|---|
| Age | HTO | OBT*2 | HTO*3 | OBT | HT*4 | CH₃T |
| 3 months | $6.4 \times 10^{-11}$ | $1.2 \times 10^{-10}$ | $6.4 \times 10^{-11}$ | $1.1 \times 10^{-10}$ | $6.4 \times 10^{-15}$ | $6.4 \times 10^{-13}$ |
| 1 years | $4.8 \times 10^{-11}$ | $1.2 \times 10^{-10}$ | $4.8 \times 10^{-11}$ | $1.1 \times 10^{-10}$ | $4.8 \times 10^{-15}$ | $4.3 \times 10^{-13}$ |
| 5 years | $3.1 \times 10^{-11}$ | $7.3 \times 10^{-11}$ | $3.1 \times 10^{-11}$ | $7.0 \times 10^{-11}$ | $3.1 \times 10^{-15}$ | $3.1 \times 10^{-13}$ |
| 10 years | $2.3 \times 10^{-11}$ | $5.7 \times 10^{-11}$ | $2.3 \times 10^{-11}$ | $5.5 \times 10^{-11}$ | $2.3 \times 10^{-15}$ | $2.3 \times 10^{-13}$ |
| 15 years | $1.8 \times 10^{-11}$ | $4.2 \times 10^{-11}$ | $1.8 \times 10^{-11}$ | $4.1 \times 10^{-11}$ | $1.8 \times 10^{-15}$ | $1.8 \times 10^{-13}$ |
| Adult | $1.8 \times 10^{-11}$ | $4.2 \times 10^{-11}$ | $1.8 \times 10^{-11}$ | $4.1 \times 10^{-11}$ | $1.8 \times 10^{-15}$ | $1.8 \times 10^{-13}$ |

(Note)
*1 The dose efficient by inhalation intake of particulate tritium compounds is described in ICRP Publ. 72, p. 44, Table A2.
*2 OBT: Organically Bound Tritium.
*3 Dose from HTO absorbed from skin is not included therein.
*4 Dose by irradiation from HT gas in lungs is not included therein.
It is estimated that it increases by about 20% if included.
[Source] ICRP: ICRP Publication 72, Pergamon Press, Oxford, (1995)
[Source] Hiroshi Takeda et al., "Radiation effects and safety control of tritium", Journal of Atomic Energy Society, 39 (11), p. 923 (1997).

large amount of impurities like chloride ions is treated as tritium water-containing raw water.

As such, the influence degree of the tritium on a living organism after conversion into tritium gas is also reduced to 1/10,000. Thus, when the effective dose coefficient is considered, it is believed that the separation coefficient equals to 12,440,000.

Several embodiments are included in the method for treating tritium water-containing raw water of the present invention. There is an embodiment in which a distillation step for separating and removing impurities like salt, Ca, and Mg contained in water for treatment, an alkali water electrolysis step to take out tritium gas from tritium water to open air to have 1/20 or less of the permissible discharge standard and also 0.047% or less/year of the tritium amount accumulated in the world and to lead the gas to high altitudes separated from any living organisms, and the circulation step and the alkali water electrolysis step are repeated to reduce the amount of the stored "treatment water" to zero at a final step. First, the explanations are given for this embodiment.

The contaminated water containing tritium produced by the first nuclear power plant of Fukushima contains a large amount of impurities like chloride ions. When gasification and dilution are performed by alkali water electrolysis, if such raw water is directly subjected to alkali water electrolysis, the chloride ions in the impurities are accumulated. Furthermore, if the chloride ions are present in caustic alkali at solubility level or higher, they are precipitated as chlorides, and thereby the electrolysis may not be continued. In this regard, according to the present invention, in a case of treating this contaminated water, those impurities are removed as salt slurry during a distillation step as a pre-step before the alkali water electrolysis, and the raw water after the removal is continuously subjected to the alkali water electrolysis.

However, when the tritium water-containing raw water to be treated contains only a small amount of the impurities like chloride ions, the impurities like chloride ions are not concentrated to the extent such that they can be precipitated as alkali metal even when the alkali water electrolysis is continuously performed. Thus, the above distillation step for removing the chloride ions before the alkali water electrolysis is not necessary. Accordingly, in such case, design can be made such that tritium water-containing raw water is directly introduced to a circulation tank for supplying the raw water to an alkali water electrolysis device.

In the present invention, the "case where the tritium water-containing raw water contains only a small amount of the impurities like chloride ions" means a case where impurities like chloride ions are hardly contained in the tritium water-containing raw water, or a case where the impurities are contained in an amount to precipitate as chlorides to the extent such that electrolysis cannot be continuously performed. Furthermore, when the impurities like chloride ions precipitate as chlorides, it is possible that part of them are drawn to be removed from a circulation pipe during the alkali water electrolysis.

According to the present invention, in the first alkali water electrolysis step of the alkali water electrolysis system (I), raw water containing only a small amount of impurities like chloride ions or raw water from which a large amount of impurities contained therein are removed by the first distillation step is used as tritium water-containing raw water, and the treatment is carried out while supplying continuously raw water in an amount corresponding to the amount of raw water lost by the alkali water electrolysis treatment from a storage tank to a circulation tank provided in the first alkali water electrolysis step. Specifically, the electrolysis is continuously performed by adjusting the alkali concentration to a desired initial concentration in the circulation tank to prepare an electrolyte and circulating the electrolyte while maintaining the alkali concentration. By electrolyzing the entire amount of the raw water stored in the storage tank as described above, the tritium water-containing raw water in the raw water is gasified and converted into tritium-containing hydrogen gas and oxygen gas. As a result, compared to a case of tritium water before the gasification, the tritium concentration is diluted to 1/1,244. Furthermore, it is effective to perform the alkali water electrolysis system (II) which consists of the second alkali water electrolysis step in which the electrolyte remaining in the first alkali water electrolysis step after the above treatment is taken out and subjected to a batch treatment, the alkali is recovered as slurry, and the electrolysis is carried out while the electrolysis capacity of the alkali water electrolysis device is adjusted to the capacity corresponding to the treatment amount of the remaining electrolyte, this embodiment will be explained later.

The tritium gas containing hydrogen gas which is obtained by gasifying the tritium water-containing raw water after the treatment of the above-mentioned first alkali water electrolysis step may be directly discharged into open air, or the tritium gas containing hydrogen gas may be delivered to a catalyst tower and reacted with water vapor on a catalyst filled in the catalyst tower and recovered as water containing concentrated tritium water (HTO). The reaction formula for such case is as follows.

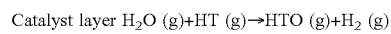

Catalyst layer $H_2O$ (g)+HT (g)→HTO (g)+$H_2$ (g)

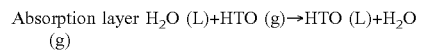

Absorption layer $H_2O$ (L)+HTO (g)→HTO (L)+$H_2O$ (g)

Hereinbelow, the embodiments of the present invention are explained with reference to the drawings.

(1) First Embodiment

FIG. 1 is a flow chart illustrating the treatment by the alkali water electrolysis system (I) of the first embodiment of the present invention, which can be applied to the tritium water-containing raw water by which, if impurities like chloride ions are not contained, or, even when they are contained, operation of the electrolysis system is not inhibited. In such case, a treatment is carried out, without having a pre-step for removing impurities, alkali water electrolysis of tritium water-containing raw water is continuously performed by the first alkali water electrolysis step while constant alkali concentration is maintained. Hereinbelow, the first embodiment of the present invention is explained with reference to the flow chart of FIG. 1.

The alkali water electrolysis system shown in FIG. 1 is the alkali water electrolysis system (I) which uses the first alkali water electrolysis step, in which the alkali water electrolysis system is composed of a raw water storage tank 1, a raw water treatment bath 2, a pump 7, an alkali water electrolysis bath 8, a circulation tank 9, electrolyte circulation pipes 10, 11, supply pumps 12, 13, and coolers 14, 15. The alkali water electrolysis bath 8 is composed of an anode chamber 16 for accommodating an anode, a cathode chamber 17 for accommodating a cathode, and a diaphragm 18 for separating the anode chamber 16 from the cathode chamber 17.

According to the first embodiment, a below-described distillation step for removing impurities like chloride ions that are contained in raw water as tritium water-containing raw water is not necessary, and the tritium water-containing raw water can be directly supplied to the circulation tank 9 of an alkali water electrolysis device. At that time, for example as shown in FIG. 1, it is possible to have a constitution in which part of the raw water is supplied from the raw water storage tank 1 for storage to the circulation tank 9 via the raw water treatment bath 2 to which the raw water is transported as a treatment subject.

The tritium water-containing raw water not containing impurities like chloride ions can be treated by the first alkali water electrolysis step by which a continuous treatment is performed in the alkali water electrolysis system (I) as shown in FIG. 1.

Furthermore, even when tritium water-containing raw water containing impurities like chloride ions is used, if the treatment amount is small, the treatment time is short, the amount of impurities is small, or the constitution includes removal of the impurities during continuous electrolysis, the tritium water-containing raw water can be treated by the first embodiment.

Hereinbelow, explanations are given for the case where 800,000 $m^3$ of raw water containing only a small amount of impurities like chloride ions is treated as tritium water-containing raw water by the alkali water electrolysis system (I) with reference to FIG. 1.

(a) In this embodiment, the treatment subject of the first alkali water electrolysis step is 800,000 $m^3$ of tritium water-containing raw water which is stored in the raw water storage tank 1. As part of this raw water, raw water of 400 $m^3$/day is supplied from the raw water storage tank 1 to the circulation tank 9 in the first alkali water electrolysis step via the raw water treatment bath 2 by means of the pump 7. Also, alkali water is supplied to the circulation tank 9 (not illustrated).

Furthermore, it is preferable that the entire amount of the raw water within the raw water storage tank 1 is transported to the circulation tank 9 via the raw water treatment bath 2, and then subjected to electrolysis treatment. If the raw water within the raw water storage tank 1 is present in a large amount, it is preferable to have a constitution that the raw water is transported in several times to the raw water treatment bath 2 and the raw water within the raw water treatment bath 2 is continuously treated. The same applies to the following embodiments and examples.

(b) Subsequently, within the circulation tank 9, the raw water within the circulation tank 9 is mixed with alkali water to yield an electrolyte to have desired alkali concentration. Then, the electrolyte is supplied to the alkali water electrolysis bath 8 for electrolysis treatment.

(c) The alkali water of the electrolyte is preferable to have high concentration. It is preferably 15% by mass, or 20% by mass or more. Furthermore, the alkali to be used is preferably KOH or NaOH.

The electrolyte within the alkali water electrolysis bath 8 is 400 $m^3$, the amount of the electrolyte within the circulation tank 9 and pipe or the like is also 400 $m^3$, and thus the entire electrolysis process volume is 800 $m^3$.

(d) The electrolyte mixed in the circulation tank 9 to have a desired alkali concentration is supplied to the anode chamber 16 of the alkali water electrolysis bath 8 through the circulation pipe 10 via the supply pump 12 and the cooler 14. At the same time the electrolyte is supplied to the cathode chamber 17 of the alkali water electrolysis bath 8 through the circulation pipe 11 via the supply pump 13 and the cooler 15. Then, the electrolyte is subjected to electrolysis. The electrolyte is electrolyzed as intermediated by the diaphragm 18. As a result of electrolysis, oxygen gas is generated in the anode chamber 16, and gas-liquid separation into generated oxygen gas and electrolyte is performed. The separated electrolyte is circulated to the circulation tank 9 through the electrolyte circulation pipe 10.

At the same time, in the cathode chamber 17, hydrogen gas is generated, and gas-liquid separation into generated hydrogen gas and electrolyte is performed. The separated electrolyte is circulated to the circulation tank 9 through the electrolyte circulation pipe 11. By setting high current density at that time, the time required for electrolysis treatment can be shortened. The current density range for operation is affected by performance of an electrolysis bath, in particular, the anode, cathode, diaphragm and the structure of a electrolysis bath that are main factors. The current density is preferable to have 15 A/$dm^2$ or more and 80 A/$dm^2$ or less. More preferably, it is 20 A/$dm^2$ or more and 60 A/$dm^2$ or less. In particular, when the amount to be gasified by electrolysis of water is set at small volume, the process amount naturally decreases. When decomposition of a large volume is carried out, the process amount naturally increases.

According to the determination by the inventors, as for the alkali water electrolysis, electrolysis can be made even with an electrolyte having alkali concentration of 32% by mass. However, when the electrolysis is carried out at a concentration higher than that, the viscosity of the electrolyte solution increases, release of generated gas to outside of the system does not occur quickly, the cell voltage becomes to have high voltage, and high energy consumption is caused. Therefore, it is not a desirable method.

When the electrolysis treatment amount is 400 $m^3$/day for the above method, the whole amount of 800,000 $m^3$ of tritium water-containing raw water will be treated for 5.5 years (800,000 $m^3$400 $m^3$/day 365 days=5.5 years).

Since the circulation amount of the electrolyte is 800 $m^3$, 800,000 $m^3$ of the tritium water-containing water is reduced to 800 $m^3$ in 5.5 years.

(e) According to the above long-term treatment, raw water in an amount corresponding to the amount of raw water lost by the electrolysis treatment is continuously supplied from the storage tank 1 to the circulation tank 9. By maintaining the alkali concentration of the electrolyte at initial concentration and continuing the electrolysis while circulating the electrolyte, the whole amount of raw water that is stored in a large amount stored in the storage tank 1 is treated by the electrolysis.

(f) As a result of the treatment by the alkali water electrolysis system (I) described above, raw water containing tritium water (HTO) is gasified and converted into tritium gas (HT) containing hydrogen gas and oxygen gas. Tritium concentration in the tritium gas (HT) containing hydrogen gas is diluted to 1/1,244 compared to a case of tritium water, and the volume of the raw water of 800,000 $m^3$ is reduced to 800 $m^3$.

According to the above continuous electrolysis mode, tritium water corresponding to the amount of water that is lost by the electrolysis is continuously supplied to the process, and the operation is performed while physical properties such as liquid amount in the electrolysis bath or discharge amount by the circulation pump of the process are always kept at constant level. At that time, the tritium water supplied to the process corresponds to the concentration of raw water.

When water is continuously supplied, it is likely to have an operation in which the tritium concentration in the process is maintained at the concentration of the raw water and the tritium in the electrolysis bath is not concentrated. Under such continuous operation conditions, the gas generated by electrolysis is converted at a ration which corresponds to the concentration ratio between light water and tritium water.

Hereinbelow, explanations are given for the treatment in which the initial concentration of tritium in the raw water is $6.3\times10^6$ to $4.2\times10^6$ Bq/L, and this concentration is changed to $4.2\times10^6$ Bq/L after the treatment.

Namely, when the electrolysis reaction selectivity of light water and tritium water is ignored, the gas generation from light water and tritium water is based on concentration ratio of each of them. In 1 L of "treatment water", about 55.6 moles of water molecule $H_2O$ are present, and $4.2\times10^6$ Bq/L of tritium water (HTO) are contained. Hydrogen gas conversion occurs according to this rate.

The separation coefficient to be obtained is as follows.

After starting the operation, when the raw water is reduced only to the circulation liquid amount (800 m$^3$) after 5.5 years, it is as follows.

> Separation coefficient=Concentration of tritium contained in raw water before treatment/Concentration of tritium contained in gasified product of raw water after treatment=$(4.2\times10^6$ Bq/L$)/(4.2\times10^6/1,244$ Bq/L$)=1,244$ Meanwhile, when the effective dose coefficient is considered as the influence degree of the tritium (HT) exhibiting an influence on living organisms, it is as follows.

Separation coefficient=12,440,000.

As such, according to the above circulation electrolysis, a large amount of tritium water (HTO) in tritium water-containing raw water is converted to tritium gas (HT) so that the influence degree of tritium on living organisms can be significantly reduced. Namely, the tritium concentration is diluted to 1/1,244 compared to the tritium concentration in raw water before treatment. Since this concentration is 1/20 of the permissible discharge standard of tritium gas, it is taken to open air and led to high altitudes separated from any living organisms.

Furthermore, when the conversion rate to tritium gas is assumed to be 40%, the amount of generated tritium gas contained in hydrogen gas is smaller so that the separation coefficient to be obtained becomes higher.

In such case, the separation coefficient is as follows.

> Separation coefficient=Concentration of tritium contained in raw water before treatment/Concentration of tritium contained in raw fluid after treatment=$(4.2\times10^6$ Bq/L$/4.2\times10^6\times0.4/1,244$ Bq/L$)=3,110$.

Meanwhile, when the effective dose coefficient is considered, the separation coefficient is 31,100,000.

When the conversion rate to tritium gas is 40%, tritium concentration occurs based on the remaining ratio (1—conversion rate) of the tritium in the electrolysis process, but as the tritium concentration in the electrolysis process is calculated by an infinite series ($\Sigma a_n = A\{1/(1-r)\}$) so that it is only 2.5 times the tritium concentration in "treatment water" than the remaining ratio r of 0.6.

This makes it possible to have less exposure to radiation by tritium even when an operation is made near the process including maintenance of the electrolysis process. Such characteristic is believed to be an excellent feature as an electrolysis plant in addition to easy operation in the field.

As described above, because the 1 mole of molecular gas has a volume of 22.4 L in the standard state, when 1 L (about 1000 g) of raw water is decomposed and gasified by electrolysis, content of tritium in 1 L of raw water is diluted to about 1/22.4 compared to 1 L of gas volume after gasification. Even if it is assumed that 1 L of liquid volume→about the maximum concentration, $0.4\times4.2\times10^6$ Bq/L/$(1,000/18\times22.4$ L$)=1.350\times10^3$ Bq/L. It has discharge 1,000/18×22.4 L gas volume, and concentration of tritium molecule in discharged gas is lower than the concentration limit per 1 L of gas volume or air, i.e., $7\times10^4$ Bq/L.

One example of the major specifications and performances of the first alkali water electrolysis step (continuous alkali water electrolysis) in the alkali water electrolysis system (I) explained above is as described below.

[Specifications]
1) Raw water including tritium-contaminated water: 800,000 m$^3$
2) Electrolysis treatment capacity: treatment amount of 400 m$^3$/day
3) Alkali: caustic soda, alkali concentration: 20% by mass
4) Concentration of discharged tritium: $1.350\times10^3$ Bq/L
5) Alkali water electrolysis bath: 48 baths (1 bath with 75 elements)
6) Current density: 40 A/dm$^2$
7) Electrolysis process: circulation type electrolysis process+continuous supply of raw water to electrolysis process

[Performances]

In general, the conversion rate of tritium in raw water is mainly dependent on the tritium concentration, but it is 1.0 to 0.6 (when fractionation is made with tritium molecular gas).

When the tritium concentration contained in raw water is $4.2\times10^6$ Bq/L, the tritium concentration contained in raw fluid after treatment with the above electrolysis system is as described below.

$4.2\times10^6\times0.4/1,244$ Bq/L=$1.350\times10^3$ Bq/L

Herein, concentration limit in discharged gas or in air is $7\times10^4$ Bq/L or less, and tritium water effluent standard is $6\times10^4$ Bq/L or less.

(2) Second Embodiment

According to a second embodiment of the present invention, oxygen gas is generated in the anode chamber 16, and after being subjected to gas-liquid separation from an electrolyte, the separated oxygen gas is discharged into open air. Simultaneously, tritium gas (HT) containing hydrogen gas is generated in the cathode chamber 17. After being subjected to gas-liquid separation from an electrolyte, it is converted into tritium gas (HT) form so that the influence degree of the tritium on living organisms is reduced to 1/10,000. Namely, it can be said that the separation coefficient is 12,440,000 when the effective dose coefficient is considered. As the tritium gas from tritium water, it is taken out to open air to have 1/20 or less of the permissible discharge standard and also 0.047% or less/year of the tritium amount accumulated in the world and then led to high altitudes separated from any living organisms.

(3) Third Embodiment

According to a third embodiment of the present invention, the gasified tritium gas containing hydrogen gas can be reacted, instead of being discharged to open air, with water vapor and recovered as water containing concentrated tritium water (HTO).

The reaction formula is as follows.

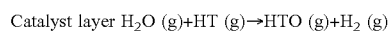
Catalyst layer $H_2O$ (g)+HT (g)→HTO (g)+$H_2$ (g)

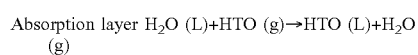
Absorption layer $H_2O$ (L)+HTO (g)→HTO (L)+$H_2O$ (g)

(4) Fourth Embodiment

FIG. 2 illustrates a fourth embodiment. The fourth embodiment relates to the alkali water electrolysis system (II) for performing batch treatment of electrolyte remained in first alkali water electrolysis step after having continuous alkali water electrolysis by the alkali water electrolysis system (I) which has been described in the above first embodiment. Specifically, according to the alkali water electrolysis system (II), the second distillation step in which the alkali component in the electrolyte which remains in the first alkali water electrolysis step is recovered as alkali salt slurry and tritium water-containing raw water distilled by the evaporator is taken out, and the second alkali water electrolysis step in which the electrolysis is performed while electrolysis capacity of an alkali water electrolysis device is adjusted to the capacity corresponding to a treatment amount of the raw water which has been taken out are performed. Furthermore, if necessary, a step in which the second distillation step and the second alkali water electrolysis step, both constituting the alkali water electrolysis system (II), are repeated several times until the completion of a batch treatment is performed.

FIG. 2 is a flow chart illustrating the fourth embodiment of the alkali water electrolysis system according to the present invention consisting of the alkali water electrolysis system (II), in which the second distillation step to recover the alkali component of the electrolyte remained in the first alkali water electrolysis step of the alkali water electrolysis system (I) shown in FIG. 1 and the second alkali water electrolysis step to perform an electrolysis treatment while adjusting the electrolysis capacity of the alkali water electrolysis device to the capacity corresponding to the treatment amount of the electrolyte solution remained in the first alkali water electrolysis step are employed.

In FIG. 2, when the treatment is repeated until the completion of the batch treatment as described above, the second distillation step becomes a distillation system which is used for the third, the fourth, . . . and following distillation steps. The distillation system of the second distillation step is composed of the storage tank 19 for storing the electrolyte remained in the first alkali water electrolysis step, a treatment bath 20, an evaporator 3, a slurry receiving bath 4, a small-size evaporator 5, a condenser 6, and the pump 7.

Furthermore, when the treatment is repeated until the completion of a batch treatment as described above, the second alkali water electrolysis step of the alkali water electrolysis system (II) becomes an alkali water electrolysis system which is used for the third, the fourth, . . . and following alkali water electrolysis steps. The alkali water electrolysis system of the second alkali water electrolysis step is composed of the alkali water electrolysis bath 8, the circulation tank 9, the electrolyte circulation pipes 10, 11, the supply pumps 12,13, and the coolers 14, 15. The alkali water electrolysis bath 8 is composed of the anode chamber 16 for accommodating an anode, the cathode chamber 17 for accommodating a cathode, and the diaphragm 18 for separating the anode chamber 16 from the cathode chamber 17.

FIG. 3 is a flow chart illustrating the process chart of the alkali water electrolysis system (II) as an embodiment carried out after treating, as tritium water-containing raw water, raw water containing only a small amount of impurities like chloride ions by the first alkali water electrolysis step in which continuous electrolysis of the alkali water electrolysis system (I) shown in FIG. 1 is performed. The alkali water electrolysis system (II) is to treat the electrolyte remained in the first alkali water electrolysis step. The alkaline water electrolysis system (II) is to perform a batch treatment of the electrolyte remained in the first alkali water electrolysis step by performing the second distillation step and the second alkali water electrolysis step shown in FIG. 2 and also by performing those treatment steps repeatedly.

As shown in FIG. 3, the method for treating tritium water-containing raw water according to this embodiment includes:
(i) After the first alkali water electrolysis step (continuous electrolysis of alkali water) of the alkali water electrolysis system (I) for raw water, by performing a treatment for the electrolyte remained in the first alkali water electrolysis step, the treatment is carried out by the alkali water electrolysis system (II) consisting of each step shown below;
(ii) The second distillation step for the electrolyte remained in the first alkali water electrolysis step (separation and recovery of the first alkali salt slurry);
(iii) The second alkali water electrolysis step for tritium water-containing water obtained in the second distillation step;
(iv) The third distillation step for the electrolyte remained in the second alkali water electrolysis step (separation and recovery of the second alkali salt slurry);
(v) The third alkali water electrolysis step for tritium water-containing water obtained in the third distillation step;
(vi) The fourth distillation step for the electrolyte remained in the third alkali water electrolysis step (separation and recovery of the third alkali salt slurry);
(vii) The fourth alkali water electrolysis step obtained in the fourth distillation step; and
(viii) The fifth distillation step for the electrolyte remained in the third alkali water electrolysis step (separation and recovery of the fourth alkali salt slurry).

For each distillation step described above, a distillation system consisting of the second distillation step shown in FIG. 2 was used. For each of the above alkali water electrolysis step, an alkali water electrolysis system consisting of the second alkali water electrolysis step shown in FIG. 2 was used, although the electrolysis capacity gradually decreases.

Hereinbelow, by having a treatment of 800,000 $m^3$ of tritium water-containing raw water as large-volume raw water containing tritium water, which contains only a small amount of impurities like chloride ions, as an example, each step for carrying out the treatment according to the process chart shown in FIG. 3 is explained in detail.
(i) First Alkali Water Electrolysis Step According to this embodiment, regarding the first alkali water electrolysis step, 800,000 $m^3$ of tritium water-containing raw water stored in the raw water storage tank 1, in which only a small amount of impurities like chloride ions is contained, is first reduced to 800 $m^3$ by the method described in the above first embodiment with the alkali water electrolysis system (I) shown in FIG. 1.
(ii) Second Distillation Step Next, after the completion of the first alkali water electrolysis step of the alkali water electrolysis system (I), the total amount of 800 $m^3$ of the electrolyte solution remained in the first alkali water electrolysis step is treated as follows by the alkali water electrolysis system (II) shown in FIG. 2. The electrolyte remained in the first alkali water electrolysis step is supplied to the evaporator 3 of the distillation system via the treatment bath 20. The tritium water-containing water distilled by the evaporator 3 is condensed by the condenser 6, and is taken out. The tritium water-containing water is supplied to circulation tank 9 of the alkali water electrolysis system (II) by means of the pump 7. In addition, the alkali water in the electrolyte remained in the first alkali water electrolysis step is taken out as alkali salt slurry by the slurry receiving bath 4. The resulting slurry is sent to the small-size evaporator 5, and by performing evaporation, crystallization/drying and the like, it is separated and recovered as a solid matter. Further evaporation, crystallization/drying of the salt slurry according to this process is an operation for reducing the volume as described below. In addition, as the wastes are solidified, the probability of having corrosive damage of a container for storing the wastes is particularly lowered compared to liquid. Performing solidification under this object is highly meaningful in terms of waste storage of radioactive substances.

As described above, the remaining liquid amount of the electrolyte after completion of the first alkali water electrolysis step in the alkali water electrolysis system (I) is 800 $m^3$. As the alkali concentration is 20% by mass, the alkali salt slurry recovered in the alkali water electrolysis system (II) is 160 $m^3$ (about 160 tons). The recovered salt slurry is sent to the small-size evaporator 5. After evaporation, crystallization/drying and the like, it is concentrated and then separated and recovered as a solid matter.

(iii) Second Alkali Water Electrolysis Step

The electrolyte taken out by the second distillation step and continuously supplied to the circulation tank 9 for a treatment by the second alkali water electrolysis step consists only of tritium water-containing water with an amount of 640 $m^3$, from which 160 $m^3$ of the alkali salt slurry is recovered and removed. In the second alkali water electrolysis step, new alkali water is supplied to the circulation tank 9, and by mixing the tritium water-containing water and newly added alkali water in the circulation tank 9, about 800 $m^3$ of electrolyte is prepared and supplied to the alkali water electrolysis device 8.

With regard to the alkali water electrolysis device 8 used for electrolysis of the second alkali water electrolysis step, for the initial treatment, the electrolysis treatment is carried out by using the very bath number used for the first alkali water electrolysis step, for example, 48 baths (75 element for 1 bath) for the above example. As for the alkali water, 5% by mass or so of alkali water electrolyte was prepared first. The current density is set at 20 $A/dm^2$. It is the same for the following third and fourth alkali water electrolysis step.

In the second alkali water electrolysis step of the alkali water electrolysis system (II), unlike the first alkali water electrolysis step, there is no additional supply of raw water and tritium water-containing water is decomposed and removed. As such, alkali water is concentrated simultaneously with a decrease in the amount of the electrolyte. Thus, an operation is performed with less operating lines of an electrolysis bath by controlling a process valve. When the electrolyte is concentrated by 6 times, the alkali concentration is from 5% by mass to 30% by mass so that the electrolysis bath is controlled to have 8-bath operation (75 elements for 1 bath).

Namely, according to the second alkali water electrolysis step, the electrolysis is performed until about 800 $m^3$ of the electrolyte is concentrated by 6 times and the alkali concentration is 30% by mass and the electrolysis bath is controlled to have 8-bath operation (75 elements for 1 bath). As a result of this treatment, 800 $m^3$ of the electrolyte is reduced to 133 $m^3$. Furthermore, operation of the second alkali water electrolysis step is carried out in the same manner as the above-mentioned first alkali water electrolysis step.

[Repeating Step]

In the repeating step consisting of the second distillation step and the second alkali water electrolysis step for constituting the alkali water electrolysis system (II), the treatment is further repeated while reducing gradually the capacity of the alkali water electrolysis device. By gasifying tritium water (HTO) in the tritium water-containing water, tritium water (HTO) is converted to tritium gas (HT), and also volume of the tritium water-containing water is further reduced. Specific explanations are given hereinbelow.

(iv) Third Distillation Step (Second Separation and Recovery of Alkali Slurry)

According to the third distillation step following the second alkali water electrolysis step, the alkali salt slurry (133 $m^3$×30% by mass=40 $m^3$) is recovered and separated. For reducing the volume, the alkali salt slurry may be further sent to the small-size evaporator 5 followed by evaporation, crystallization/drying and the like, and then it can be used again.

(v) Third Alkali Water Electrolysis Step

The electrolysis treatment of tritium water-containing water obtained by the third distillation step is carried out in the same manner as the second alkali water electrolysis step except that capacity of the alkali water electrolysis device is reduced. Namely, according to the third alkali water electrolysis step, 8 baths of the alkali water electrolysis bath 8 are used to start the electrolysis, and an operation is performed with less operating lines of an electrolysis bath until the electrolyte solution of 4 times is yielded by controlling a process valve. Then, when the electrolyte is concentrated by 4 times, the alkali concentration increases from 5% by mass to 20% by mass so that the electrolysis bath is controlled to have 2-bath operation. As a result of this treatment, 133 $m^3$ of the electrolyte is reduced to 22.17 $m^3$.

(vi) Fourth Distillation Step and (vii) Fourth Alkali Water Electrolysis Step

Subsequently, in the same manner as the third case, alkali salt (22.17 $m^3$×20% by mass=4.4 $m^3$) was separated and recovered by the fourth distillation step. The electrolysis treatment of the tritium water-containing water obtained from the fourth distillation step is performed in the same manner as the second alkali water electrolysis step except that capacity of the alkali water electrolysis device is reduced. Namely, the alkali water electrolysis device 8 is operated after modifying 1 bath with 75 elements to 1 bath with 8 elements, and after performing the fourth alkali water electrolysis step, 5% by mass caustic alkali was added to prepare the electrolyte at 23 $m^3$. As a result of this treatment, the electrolyte was concentrated by 19.17 times (23÷1.2=19.17) and the volume was reduced from 23 $m^3$ to 1.2 $m^3$.

(viii) Fifth Distillation Step

Finally, the caustic property of the obtained alkali water electrolyte in an amount of about 1.2 $m^3$ was separated and removed with the evaporator 3 during the fifth distillation step. As a result, distilled water containing about 1 $m^3$ of tritium is obtained. The operations following the second alkali water electrolysis step can be completed by an operation for 1 month or so, even if a sufficient operation interval is applied.

Furthermore, 1 $m^3$ of tritium water, which is finally obtained, can be almost completely converted into tritium gas by electrolysis if the same treatment is repeated with a smaller electrolysis device. Namely, the amount of tritium water waste can be reduced to almost zero.

For the repeating operation of the repeating step, 32% by mass was set as an upper limit of actual plant operation. However, the operation can be made as high as 40 to 50% by mass. For example, when light hydrogen and tritium gas that are simultaneously generated are discharged, without having any particular fractional process, to the outside of the process via water seal system, conversion rate of the tritium gas changes delicately in view of the relationship between the decrease in the electrolyte and the increase in alkali concentration. However, by confirming the conversion rate over time based on initial conversion rate relative to concentration change of 10 times and the change rate at final concentration, the conversion rate of the tritium gas at each state is obtained. One example is shown below.

For example, when treatment water of 1 L (55.6 moles of water) is electrolyzed in batch mode until the alkali is concentrated by 10 times (i.e., 1 L→0.1 L), hydrogen gas generated at the cathode has a volume which is increased by 1,120 times (55.6×0.9×22.4 L) in the standard state. This means that the tritium is diluted by the gas generated at cathode. Thus, with such dilution ratio, $4.2 \times 10^6$ Bq/L of tritium contained in raw water may yield by itself tritium concentration of $3.37 \times 10^3$ Bq/L $(=4.2 \times 10^6$ Bq/L$\times 0.9/1,120)$, and it is a concentration which is less than 1/20 of the permissible discharge standard of tritium gas.

Separation coefficient=Concentration of tritium contained "treatment water" before treatment/Concentration of tritium contained in "treatment gas" after treatment=$(4.2 \times 10^6$ Bq/L/$4.2 \times 10^6$/1, 120 Bq/L=1,120

Meanwhile, because conversion is made from tritium water (HTO) form to tritium gas (HT) form, and the dose coefficient as radiation indicator exhibiting an influence on living organisms is 1/10,000, the separation coefficient considering the effective dose coefficient is as follows.

Separation coefficient=11,200,000.

For shortening the period required for volume reduction, the period can be relatively shortened in proportion to an increase in current density. Meanwhile, considering the power consumption amount of the process and stable and safe operation, there is naturally a limit for having high current density. For the alkali water electrolysis, about 60 A/dm$^2$ is an upper region at present moment.

(5) Fifth Embodiment and Sixth Embodiment

With regard to tritium water-containing water according to a fifth embodiment, a method for treating a large amount of raw water containing tritium water which contains a large amount of impurities like chloride ions is shown. As shown in FIG. 4, as a pre-step before the first alkali water electrolysis step (continuous alkali electrolysis) of the above-mentioned alkali water electrolysis system (I), the first distillation step (removal of salt slurry) is performed. In FIG. 4, the distillation system used for the first distillation step is shown at the upper left corner, and the alkali water electrolysis system (I) to perform the first alkali water electrolysis step is shown at the upper right corner. As shown in FIG. 4, the fifth embodiment is the same as the aforementioned first embodiment except that the distillation step is provided as a pre-step for removing a large amount of impurities from raw water before the first alkali water electrolysis step. Since the details of the first distillation step are the same as the sixth embodiment, explanations will be given later.

Like the fifth embodiment, a sixth embodiment includes performing the first distillation step (removal of salt slurry) as a pre-step before the first alkali water electrolysis step (continuous electrolysis of alkali water) of the above-mentioned alkali water electrolysis system (I), and after the first alkali water electrolysis step as a pre-step (I), performing repeatedly the second distillation step and the second alkali water electrolysis step which constitute the alkali water electrolysis system (II) shown in FIG. 2 which is explained in the fourth embodiment for a batch treatment of the electrolyte remained in the first alkali water electrolysis step. Specifically, the sixth embodiment consists of each of the following steps as shown in FIG. 5, i.e., (0) the first distillation step (removal of salt slurry) as a pre-step, (i) (I) the first alkali water electrolysis step (continuous electrolysis of alkali water) for raw water from which impurities have been removed, (ii) the second distillation step (separation and recovery of the first alkali salt slurry) for the electrolyte remained in the first alkali water electrolysis step as the alkali water electrolysis system (I), (iii) the second alkali water electrolysis step for tritium water-containing water obtained from the second distillation step, (iv) the third distillation step (separation and recovery of the second alkali salt slurry) for the electrolyte remained in the second alkali water electrolysis step as the alkali water electrolysis system (II), (v) the third alkali water electrolysis step for tritium water-containing water obtained from the third distillation step, (vi) the fourth distillation step (separation and recovery of the third alkali salt slurry) for the electrolyte remained in the third alkali water electrolysis step, (vii) the fourth alkali water electrolysis step obtained from the fourth distillation step, and (viii) the fifth distillation step (separation and recovery of the fourth alkali salt slurry) for the electrolyte remained in the fourth alkali water electrolysis step.

Hereinbelow, the embodiment 6 is explained as an example for treating 800,000 m$^3$ of tritium water-containing raw water as a large amount of raw water containing tritium water which contains a great amount of impurities like chloride ions. FIG. 4 is a flow chart illustrating the sixth embodiment of the alkali water electrolysis system according to the present invention, which is used for, when raw water containing a large amount of impurities like chloride ions is used as tritium water-containing raw water, the first distillation step as a pre-step of electrolysis carried out for removing the impurities, the first alkali water electrolysis step as the alkali water electrolysis system (I) in which continuous electrolysis is performed while maintaining constant alkali concentration, the second distillation in which, as the alkali water electrolysis system (II), the alkali component of the electrolyte solution remained in the first alkali water electrolysis step is recovered, and the second alkali water electrolysis step to have an electrolysis treatment while adjusting the electrolysis capacity of the alkali water electrolysis device to the capacity corresponding to the treatment amount of the electrolyte solution remained in the first alkali water electrolysis step. Furthermore, FIG. 5 is a flow chart illustrating the sixth embodiment as a treatment method for treating raw water containing a large amount of impurities like chloride ions as tritium water-containing raw water as described above.

(0) First Distillation Step as Pre-Step

When raw water containing a great amount of impurities like chloride ions is treated, a large amount of raw water including contaminated water which contains tritium water is supplied from the raw water storage tank 1 to the first distillation step via the raw water treatment bath 2 as shown in FIG. 4. The raw water supplied to the raw water treatment bath 2 is sent to the evaporator 3. Then, salt slurry including all the impurities like salts, calcium, magnesium, and other radioactive nuclear species, which are contained in raw water, are collectively stored in the slurry receiving bath 4. The salt slurry can be stored for a long period of time in Ti tank. However, as the Ti material is expensive, it is also possible to store the salt slurry with a material in which rubber lining is applied to an inexpensive stainless base.

The salt slurry is sent to the small-size evaporator 5, and for the purpose of further reducing the volume, it is preferable to perform concentration and semi solidification of slurry by carrying out evaporation, crystallization/drying. Furthermore, it is constituted such that tritium water-containing water evaporated from the small-size evaporator 5 is condensed in the condenser 6 together with tritium water-containing water evaporated from the evaporator 3 used for obtaining the above salt slurry, and then supplied to the circulation tank 9 by means of the pump 7. Meanwhile, it is necessary that the slurry containing radioactive materials is handled by manless operation as much as possible regarding obtainment of solid salt containing radioactive materials, storage of the solid salt, maintenance of a device and apparatus for concentration, and the like. For example, the solid salt containing radioactive materials is stored in a stainless container with rubber lining which has no problem in terms of long-term resistance to corrosion. As described below, the corrosion property is significantly lowered, and the effect of having remarkable volume reduction is huge by semi-solidification of salt.

For example, when impurities are removed by treating contaminated water which contains 800,000 $m^3$ of tritium water as raw water, if a treatment bath having process capacity of 400 $m^3$/day is used as the raw water treatment bath 2, the salt slurry obtained by a treatment of the first distillation step as a pre-step will have a volume of 40 $m^3$ so that a state having 10 times condensation than the salt slurry is obtained.

By the first distillation step, the waste as impurities from 400 $m^3$/day can be discarded as solid salt of about 8 $m^3$/day. As such, compared to 800,000 $m^3$ of contaminated water containing tritium water, volume of the waste as impurities is reduced to 16,000 $m^3$ of a solid salt waste (1/50 reduction). This means that, although no tritium is present in the solid salt waste, if a radioactive material like a trace amount of Co is present, such radioactive material is also concentrated by 50 times compared to the original concentration.

(i) First Alkali Water Electrolysis Step (Continuous Alkali Electrolysis) as Alkali Water Electrolysis System (I)

As described above, according to the sixth embodiment (and also for the fifth embodiment), the salt slurry removed from raw water treated at 400 $m^3$/day is 40 $m^3$/day, and tritium water-containing raw water excluding the impurities that are removed as this salt slurry is condensed by the condenser 5. The raw water is supplied to the circulation tank 9 of an alkali water electrolysis system which is used for the first alkali water electrolysis step as a next step at 360 $m^3$/day by means of the pump 7. As described before, when the salt slurry is distilled and crystallized by the small-size evaporator 5 and then distilled water and tritium water are recovered from the salt slurry, tritium water-containing water condensed by the condenser 6 is 392 $m^3$/day.

According to the sixth embodiment (and also for the fifth embodiment), tritium water-containing water is supplied to the circulation tank 9 of the first alkali water electrolysis step at 360 $m^3$/day to 392 $m^3$/day by means of the pump 7. At the same time, alkali water is supplied and mixed therein so that the electrolyte at 400 $m^3$/day is adjusted to alkali concentration of 20% by mass. The electrolyte in the alkali water electrolysis bath 8 is 400 $m^3$, and the amount of the electrolyte in the circulation tank 9, pipe, or the like is 400 $m^3$. Thus the entire electrolysis process capacity is 800 $m^3$.

The electrolyte controlled to have alkali concentration of 20% by mass according to mixing in the circulation tank 9 is supplied to the anode chamber 16 of the alkali water electrolysis bath 8 via the circulation pipe 10 by means of the supply pump 13 and the cooler 14. In the same manner, supplied to the cathode chamber 17 of the alkali water electrolysis bath 8 via the circulation pipe 11 by means of the supply pump 13 and the cooler 15.

The electrolyte prepared as alkali water with desired concentration is supplied at 400 $m^3$/day to the inside of the alkali water electrolysis bath 8 for electrolysis. The electrolyte is electrolyzed by a diaphragm. In the anode chamber 16, oxygen gas is generated. The generated oxygen and the electrolyte are separated. The separated electrolyte is circulated to the circulation tank 9 via the electrolyte circulation pipe 10.

At the same time, in the cathode chamber 17, hydrogen gas is generated. The generated hydrogen and the electrolyte are separated. The separated electrolyte is circulated to the circulation tank 9 via the electrolyte circulation pipe 11. By setting high current density at that time, time required for the electrolysis treatment can be shortened. The current density is preferably 20 A/$dm^3$ or more and 60 A/$dm^3$ less. The circulation liquid amount of the electrolyte solution is 800 $m^3$ for this entire electrolysis process. This amount is simply based on the process design, and the present invention is not limited to it. In particular, if the amount to be gasified by electrolysis of water is designed to be small, the process amount is also small. On the other hand, if large scale decomposition is carried out, the process amount generally increases. With regard to the alkali water electrolysis, electrolysis is possible even at the concentration of 32% by mass. However, when the electrolysis is carried out at a concentration higher than that, the viscosity of the electrolyte solution increases, release of generated gas to outside of the system does not occur quickly, the cell voltage becomes to have high voltage, and high energy consumption is caused, and therefore it is not a desirable method. Thus, the continuous electrolysis is terminated at this moment, and for the purpose of decomposition of electrolyte to alkali and water, the electrolyte remained in the first alkali water electrolysis step as the alkali water electrolysis system (I) is transferred to the second distillation step, the second alkali water electrolysis step, and the final volume decreasing step as the alkali water electrolysis system (II), as described above for the fourth embodiment.

When the electrolysis treatment amount is 400 $m^3$/day, the whole amount of 800,000 $m^3$ of raw water including contaminated water containing tritium water will be treated for 5.5 years (800,000 $m^3$÷400 $m^3$/day 365 days=5.5 years). Furthermore, the circulation amount of the electrolyte at that time is 800 $m^3$, and 800,000 $m^3$ of the tritium water-containing water will be reduced to 800 $m^3$ in 5.5 years.

According to the fifth and the sixth embodiments, impurities in a large amount of raw water containing tritium water, which contains impurities like chloride ions, are removed as salt slurry by the method shown in FIG. 4, and the electrolysis performed at the first alkali water electrolysis step to decompose the raw water into oxygen and hydrogen. Thereby, the tritium present as water molecule in the raw water is converted to a tritium molecule and fractionated from the raw water.

As shown in FIGS. 4 and 5, in the sixth embodiment, after completion of the first alkali water electrolysis step, the whole amount of the electrolyte remained in the first alkali water electrolysis step is supplied to the evaporator 3 of a distillation system like the aforementioned fourth embodiment, and treated similarly via the following steps, i.e., (ii) as the alkali water electrolysis system (II), the second distillation step (separation and recovery of the first alkali salt slurry) for the electrolyte remained in the first alkali water electrolysis step, (iii) the second alkali water electrolysis step for tritium water-containing water obtained in the second distillation step, (iv) the third distillation step (separation and recovery of the second alkali salt slurry) for the electrolyte remained in the second alkali water electrolysis step, (v) the third alkali water electrolysis step for tritium water-containing water obtained in the third distillation step, (vi) the fourth distillation step (separation and recovery of the third alkali salt slurry) for the electrolyte remained in the third alkali water electrolysis step, (vii) the fourth alkali water electrolysis step obtained in the fourth distillation step, and (viii) the fifth distillation step (separation and recovery of the fourth alkali salt slurry) for the electrolyte remained in the fourth alkali water electrolysis step.

Volume of the electrolyte remained after the fourth alkali water electrolysis step is reduced to 1.2 m³. During the fifth distillation step, the finally obtained alkali water electrolyte in an amount of about 1.2 m³ is separated and removed as alkali salt slurry by the evaporator 3 to be recovered, and at the same time, distilled water containing tritium in an amount of 1 m³ is obtained.

The operations following the second alkali water electrolysis step can be completed by an operation for 1 month or so, even when a sufficient operation interval is applied. 1 m³ of the tritium water can be almost completely converted into tritium gas by electrolysis if the same treatment is repeated with a smaller electrolysis device. Namely, the amount of tritium water waste can be reduced to almost zero.

Furthermore, according to the above sixth embodiment, as for the facilities for the distillation steps of the second, the third, and the following steps, the facilities used for the first distillation step as a pre-step for removing impurities like a large amount of chloride ions in the tritium water-containing water can be also used, and thus significant saving of facility can be achieved.

EXAMPLES

Next, the examples of the present invention are explained, but the present invention is not limited to those examples.

<Example 1> (Example of the First Embodiment)

As simulated liquid of tritium water-containing raw water not containing impurities (hereinbelow, referred to as simulated liquid), the simulated liquid with the following components was used.

Simulated liquid: 180 L
Initial concentration of tritium in the simulated liquid: $4.2 \times 10^6$ Bq/L As shown in FIG. 1, the raw water storage tank 1 added with 180 L of the simulated liquid was prepared. In the present test, the liquid was supplied from the raw water storage tank 1 to the circulation tank 9 via the treatment bath 2. Specifically, the simulated liquid was supplied at 9.67 L/day from the raw water storage tank 1 to the circulation tank 9 via the treatment bath 2 by means of the pump 7. In the present test, electrolyte including the simulated liquid was continuously supplied in the first alkali water electrolysis step, and continuous electrolysis was performed while circulating the electrolyte.

Specifically, to the circulation tank 9, the simulated liquid is supplied at 9.60 L/day by means of the pump 7, and at the same time, alkali water is supplied and mixed to give an electrolyte of 9.67 L/day of which alkali concentration is adjusted to 20% by mass, and continuous electrolysis was performed while circulating this electrolyte.

The electrolyte in the alkali water electrolysis bath 8 is 30 L (2 cells of 15 dm² cell (15 L)), and the amount of the electrolyte in the circulation tank 9, pipe, or the like is 12 L. Thus, the entire electrolysis process volume is 42 L. The electrolyte of which alkali concentration is controlled to 20% by mass, as obtained by mixing alkali in the circulation tank 9, was supplied to the anode chamber 16 of the alkali water electrolysis bath 8 through the circulation pipe 10 via the supply pump 13 and the cooler 14. At the same time, the electrolyte is supplied to cathode chamber 17 of the alkali water electrolysis bath 8 through the circulation pipe 11 via the supply pump 13 and the cooler 15. The electrolyte adjusted to have concentration of 20% by mass of alkali water is electrolyzed as intermediated by a diaphragm. Oxygen gas is generated from the anode chamber 16, and gas-liquid separation into generated oxygen gas and electrolyte is performed. The separated electrolyte is circulated to the circulation tank 9 through the electrolyte circulation pipe 10. At the same, hydrogen gas is generated inside the cathode chamber 17, and gas-liquid separation into generated hydrogen gas and electrolyte is performed. The separated electrolyte is circulated to the circulation tank 9 through the electrolyte circulation pipe 11.

As described above, in this example, simulated liquid as raw water was electrolyzed by the alkali water electrolysis according to the method shown in FIG. 1 so that the raw water is decomposed into oxygen and hydrogen. Thereby tritium present as water molecule in the raw water is fractionated as tritium molecule from the raw water. Water was decomposed by electrolysis only into hydrogen and oxygen gas. Thus, after adjusting the initial alkali concentration, electrolysis was performed while raw water (simulated water) in an amount corresponding to the water lost by electrolysis is supplied to the circulating electrolyte. Furthermore, if necessary, distilled water or pure water may be added to the raw water to maintain the alkali concentration at the initial concentration.

In the present example, continuous alkali electrolysis in the first alkali water electrolysis step was carried out according to the following conditions.

Electrolysis cell: 2 cells (30 L) of 15 dm² cell (15 L) were used.
Current density for operation: 40 A/dm²
Caustic concentration: NaOH, 20% by mass
Membrane: diaphragm
Anode/cathode: Ni base+active coating
Circulation: External circulating system
Water seal: water seal system to control gas pressure 50-100 mm $H_2O$ cathode pressure
Volume of electrolyte: 42 L (electrolysis cell: 15×2=30 L, circulation pipe or the like: 12 L)
Electrolysis current was 600 A (15 dm²×40 A/dm²).

According to continuous electrolysis, as described above, the operation is made while raw water (simulated water) in an amount corresponding to the water decomposed and lost by electrolysis is supplied continuously to the process and a physical environment of operations such as liquid amount in an electrolysis bath or discharge amount by a circulation pump is maintained at constant level during the process. When the raw water is continuously supplied, the operation is made such that tritium concentration in the process is maintained at the concentration of simulated liquid while the tritium inside the electrolysis bath is not concentrated. As such, according to the conditions of this continuous operation, gas generated by the electrolysis is converted to the ratio which corresponds to the concentration ratio between light water and tritium water.

The circulation amount of electrolysis at that time was 42 L, and 180 L of tritium water-containing water was reduced to 42 L during 15.2 days (365 hours).

When continuous operation is made for 15.2 days (365 hours) after starting the operation, tritium removal is described as follows.

Separation coefficient=Concentration of tritium contained raw water before treatment/Concentration of tritium contained in raw material gasification after treatment=$(4.2\times10^6$ Bq/L$)/(4.2\times10^6/1,244$ Bq/L$)=1,244$ Meanwhile, when the effective dose coefficient is considered as the influence degree of the tritium (HT) exhibiting an influence on living organisms, it is as follows.

Separation coefficient=12,440,000.

Thus, as tritium water (HTO) in the large volume of tritium water-containing water is converted to tritium gas (HT), the tritium concentration is diluted to 1/1,244 and the tritium's influence on living organisms is significantly lowered.

<Example 2> (Example of the Second Embodiment)

Diluted tritium gas was taken out to open air in an amount of 1/20 of the permissible discharge standard, and led to high altitudes separated from any living organisms.

<Example 3> (Example of the Third Embodiment)

The gasified tritium gas containing hydrogen gas was reacted with water vapor instead of discharge to open air. Accordingly, it was recovered as tritium water (HTO) containing water. The reaction formula is as described below.

Catalyst layer $H_2O$ (g)+HT (g)→HTO (g)+$H_2$ (g)

Absorption layer $H_2O$ (L)+HTO (g)→HTO (L)+$H_2O$ (g)

<Example 4> (Example of the Fourth Embodiment)

(i) First Alkali Water Electrolysis Step (Continuous Alkali Electrolysis)

Continuous electrolysis was performed in the same manner as Example 1, and 180 L of tritium water-containing water as simulated liquid was reduced to 42 L for 15.2 days (365 hours).

(ii) Second Distillation Step

After completion of the first alkali water electrolysis step, as shown in FIGS. 2 and 3, the whole amount of the electrolyte remained in the first alkali water electrolysis step was supplied to the evaporator 3 of a distillation system, and tritium water-containing water distilled by the evaporator 3 was condensed by the condenser 6. After taking out the water, it was supplied to the circulation tank 9 of an alkali water electrolysis system by means of the pump 7. Also, the alkali water in the electrolyte remained in the first alkali water electrolysis step was recovered as alkali caustic salt slurry from the slurry receiving bath 4. Further, for reducing the volume, the slurry was sent to the small-size evaporator 5 and subjected to evaporation, crystallization/drying and the like to have concentration and semi solidification of slurry.

As described above, the liquid amount of the electrolyte is 42 L, and the alkali concentration is 20% by mass. Thus, the alkali caustic salt slurry recovered in the second distillation step is 8.4 L. The recovered caustic salt slurry was concentrated and then separated as a solid matter. Further, for reducing the volume, it was sent to the small-size evaporator 5 for evaporation, crystallization/drying. Accordingly, about 5 L (specific gravity of 2.13) of 10.5 Kg $(10.5/(42+10.5)\times100=20\%$ by mass) of a solidified alkali in an amount which corresponds to the amount of the alkali prepared before the electrolysis can be recovered.

(iii) Second Alkali Water Electrolysis Step

The electrolyte taken out in the second distillation step and supplied to the circulation tank 9 is recovered and removed as 8.4 L of alkali caustic salt slurry, and it contains just tritium water-containing water. The amount of the tritium water-containing water is 42−8.4=33.6 L. While this tritium water is supplied to the circulation tank 9, fresh alkali water is added to the circulation tank 9. The electrolyte in which tritium water-containing water is mixed with alkali water was adjusted to 42 L in the circulation tank 9, and the adjusted electrolyte was supplied to the alkali water electrolysis device 8.

The alkali water electrolysis device 8 used for the electrolysis is first used with the same capacity as the capacity used for the first alkali water electrolysis step and then the electrolysis was carried out. As for the alkali water, about 5% by mass of alkali water electrolyte was prepared first. The current density was 20 A/dm², and it remains the same for the following third and fourth alkali water electrolysis steps.

For the second alkali water electrolysis step of the alkali water electrolysis system (II), since further addition of raw water was not made and water in the raw water (simulated liquid) is decomposed and removed, the electrolyte amount was reduced and at the same time the alkali water was concentrated. Thus, by controlling a process valve, an operation was performed with less operating lines of an electrolysis bath. When the electrolyte is concentrated by 5.25 times, the alkali concentration was from 5% by mass to 26.25% by mass so that volume of the electrolyte (42 L) was reduced as follows: 42/5.25=8 L.

Operation of the second alkali water electrolysis step was performed in the same manner as the first alkali water electrolysis step.

(iv) Third Distillation Step, Repeating Step.

According to the repeating step, the second distillation step and the second alkali water electrolysis step were repeated while reducing gradually the capacity of the alkali water electrolysis device so that tritium water (HTO) in the raw water is gasified and converted into tritium gas (HT) and volume of the tritium water-containing water is further reduced.

After the second alkali water electrolysis step, the alkali caustic salt slurry was recovered and separated by the third distillation step. For further reducing the volume, the alkali caustic salt slurry was sent to the small-size evaporator 5 and subjected to evaporation, crystallization/drying, and then recovered as a solid alkali. After that, according to the third alkali water electrolysis step, the electrolysis was initiated with 8 L using the electrolyte in the alkali water electrolysis bath 8. The test was carried out while reducing the number of elements until the electrolyte is concentrated by 4 times. Since the alkali concentration was from 5% by mass to 20% by mass, the electrolysis bath was controlled to have an operation of 2 L. As a result of the treatment, 8 L volume of the electrolysis was reduced to 2 L.

The operations following the second alkali water electrolysis step can be completed by an operation for 1 month or so even if a sufficient operation interval is considered, although the influence of operation current density is significant.

<Example 5> (Example of the Fifth Embodiment)

(0) First Distillation Step as Pre-Step

As simulated liquid of raw water including contaminated water containing tritium water which contains a large amount of impurities, the simulated liquid with the following components was used.

Simulated liquid: 180 L
Initial concentration of tritium in raw water: $4.2 \times 10^6$ Bq/L
Components and concentration of impurities:
Table salt: 10 g/L
Calcium: 2 ppm
Magnesium: 5 ppm As shown in the upper panel of FIG. 4, 180 L of the simulated liquid was supplied from the raw water storage tank 1 to the raw water treatment bath 20. As the raw water treatment bath 20, a treatment bath having treatment capacity of 9.67 L/day was used. The simulated liquid supplied to the raw water treatment bath 20 was sent to the evaporator 3, and impurities like salts, calcium, and magnesium in the simulated liquid were collectively removed as 18 L of salt slurry.

Meanwhile, 18 L of the salt slurry was sent to the small-size evaporator 5 and subjected to evaporation, crystallization/drying for further reducing of the volume. Accordingly, concentration and semi solidification of the slurry was performed to give 0.9 L of a solidified salt.

Thus, 180 L of the simulated liquid was turned out to be reduced to 0.9 L of solid salt waste as the waste of impurities.

The tritium water-containing water evaporated from the small-size evaporator 5 for raw water was condensed by the condenser 6 together with tritium water-containing water evaporated by the evaporator 3, and supplied to the circulation tank 9 via the pump 7. The tritium water-containing water was at 9.60 L/day.

(i) First Alkali Water Electrolysis Step as Alkali Water Electrolysis System (I)

The tritium water-containing water at 9.60 L/day as treated above was supplied to the circulation tank 9 of an alkali water electrolysis system which is used for the first alkali water electrolysis step as a following step via the pump 7. According to the first alkali water electrolysis step, the tritium water-containing water was continuously supplied by the method described in Example 1 so that the electrolyte is electrolyzed under circulation.

<Example 6> (Example of the Sixth Embodiment)

After completion of the (i) the first alkali water electrolysis step, (ii) the second distillation step, (iii) the second alkali water electrolysis step, and also the repeating step were carried out in the same manner as the method described in Example 4, as shown in FIGS. 4 and 5.

INDUSTRIAL APPLICABILITY

According to the present invention, by gasifying tritium water (HTO) in tritium water-containing water for conversion to tritium gas (HT) and oxygen gas and by diluting the tritium concentration to 1/1,244, the influence degree of the tritium on a living organism can be particularly reduced, so that the tritium can be led to high altitudes separated from any living organisms. It is also possible that the gasified tritium gas containing hydrogen gas is reacted with water vapor and recovered as tritium water (HTO) containing water. Furthermore, according to the present invention, even for tritium water-containing raw water which contains a large amount of impurities like chloride ions, continuous electrolysis can be made by removing in advance the impurities in raw water as salt slurry, and thus the aforementioned effect is also obtained. Furthermore, because the impurities in raw water can be recovered as alkali salt slurry, it can be realized also considering an area of a plant and cost involved with construction and running the plant, and thus the industrial contributiveness is very high.

REFERENCE SIGNS LIST

1: Raw water storage tank
2: Raw water treatment bath
3: Evaporator
4: Slurry receiving bath
5: Small-size evaporator
6: Condenser
7: Pump
8: Alkali water electrolysis bath
9: Circulation tank
10, 11: Electrolyte circulation pipe
12, 13: Supply pump
14, 15: Cooler
16: Anode chamber for accommodating anode
17: Cathode chamber for accommodating cathode
18: Diaphragm for separating anode chamber 16 from cathode chamber 17
19: Storage tank for storing electrolyte remained in first alkali water electrolysis step
20: Treatment bath

The invention claimed is:

1. A method for treating tritium water-containing raw water by which tritium water-containing raw water is treated by a first alkali water electrolysis step comprising the steps of:
   (1) supplying a part of raw water containing tritium water and alkali water to a circulation tank;
   (2) mixing the raw water with the alkali water in the circulation tank to obtain an electrolyte adjusted so as to have a desired alkali concentration, supplying the electrolyte to an alkali water electrolysis device, and performing electrolysis treatment;
   (3) supplying the raw water continuously to the circulation tank in an amount which corresponds to raw water lost by the above electrolysis treatment to maintain alkali concentration at an adjusted initial concentration, and continuing the electrolysis treatment while circulating the electrolyte in order to continuously perform the alkali water electrolysis treatment;
   (4) gasifying the raw water to tritium-containing hydrogen gas and oxygen gas so that tritium concentration is diluted to 1/1,244 relative to tritium concentration in the raw water; and
   (5) reducing the volume of the raw water.

2. The method for treating tritium water-containing raw water according to claim 1, wherein the tritium-containing hydrogen gas generated by the first alkali water electrolysis step is taken out to open air.

3. The method for treating tritium water-containing raw water according to claim 1, wherein the tritium-containing hydrogen gas generated by the first alkali water electrolysis step is sent to a catalyst tower, the tritium-containing hydrogen gas is reacted with water vapor on a catalyst filled in the catalyst tower, and the tritium is recovered as concentrated tritium water-containing water.

4. The method for treating tritium water-containing raw water according to claim 1, the method comprising:
the first alkali water electrolysis step for performing continuously the alkali water electrolysis treatment;
a second distillation step in which, after completion of the first alkali water electrolysis step, the entire amount of the electrolyte remained in the first alkali water electrolysis step is supplied to an evaporator, an alkali component in the electrolyte is recovered as alkali salt slurry, and simultaneously, tritium water-containing water distilled by the evaporator is taken out; and
a second alkali water electrolysis step in which the tritium water-containing water taken out by the second distillation step and new alkali water are supplied to a circulation tank, the tritium water-containing water is mixed with the new alkali water in the circulation tank so as to have an electrolyte solution with a desired alkali concentration, electrolysis capacity of an alkali water electrolysis device is adjusted to the capacity suitable for a treatment amount of the electrolyte, an alkali water electrolysis treatment is performed followed by batch treatment, the tritium water-containing water is gasified and converted to tritium-containing hydrogen gas and oxygen gas so that tritium concentration is diluted to 1/1,244 relative to tritium concentration in the tritium water-containing water, and the volume of the raw water is reduced,
if necessary, further comprising a step of repeating several times the second distillation step and the second alkali water electrolysis step until the completion of the batch treatment in which, at the time of repeating several times, the capacity of the alkali water electrolysis device used for the second alkali water electrolysis step is gradually reduced and the treatment is repeated.

5. The method for treating tritium water-containing raw water according to claim 1, wherein, when raw water which contains impurities including a large amount of chloride ions is used as the tritium water-containing raw water, a first distillation step for removing the impurities is further provided as a pre-step of the first alkali water electrolysis step, and in the first distillation step, the raw water which contains impurities including the chloride ions is supplied to the evaporator and the impurities are removed as salt slurry, and simultaneously, the tritium water-containing raw water after removing the impurities is taken out and then continuously supplied to be treated by the first alkali water electrolysis step.

6. The method for treating tritium water-containing raw water according to claim 4, wherein, when raw water which contains impurities including a large amount of chloride ions is used as the tritium water-containing raw water, a first distillation step for removing the impurities is provided as a pre-step of the first alkali water electrolysis step, and in the first distillation step, the raw water which contains impurities including the chloride ions is supplied to the evaporator and the impurities are removed as salt slurry, and simultaneously, the tritium water-containing raw water after removing the impurities is taken out and then continuously supplied to be treated by the first alkali water electrolysis step.

7. The method for treating tritium water-containing raw water according to claim 5, wherein, in the first distillation step, the salt slurry is concentrated and then separated and recovered as a solid matter.

8. The method for treating tritium water-containing raw water according to claim 4, wherein, in the second distillation step, the alkali salt slurry is concentrated and then separated and recovered as a solid matter.

9. The method for treating tritium water-containing raw water according to claim 4, wherein, in the first alkali water electrolysis step, alkali water with relatively high concentration is used as the alkali water and the electrolysis treatment is performed at relatively high current density, and in the second alkali water electrolysis step, alkali water with relatively low concentration is used as the alkali water and the electrolysis treatment is performed at relatively low current density.

10. The method for treating tritium water-containing raw water according to claim 1, wherein, in the first alkali water electrolysis step, 15% by mass or more of alkali water is used as the alkali water, and the electrolysis treatment is performed at current density of 15 A/dm² or higher.

11. The method for treating tritium water-containing raw water according to claim 4, wherein, in the second alkali water electrolysis step, 2 to 10% by mass of alkali water is used as the alkali water, and the electrolysis treatment is performed at current density of 5 to 20 A/dm².

* * * * *